(12) United States Patent
Takachi

(10) Patent No.: US 7,530,645 B2
(45) Date of Patent: May 12, 2009

(54) BICYCLE WHEEL SECURING STRUCTURE

(75) Inventor: Takeshi Takachi, Kawachinagano (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/680,770

(22) Filed: Mar. 1, 2007

(65) Prior Publication Data
US 2008/0211296 A1    Sep. 4, 2008

(51) Int. Cl.
B60B 35/00    (2006.01)
(52) U.S. Cl. .............. 301/124.2; 301/110.5; 403/374.1; 403/374.4
(58) Field of Classification Search .............. 301/110.5, 301/110.6, 124.2; 403/109.5, 297, 374.1, 403/374.2, 374.3, 374.4, 374.5, 377, 370; 280/279, 288
See application file for complete search history.

(56) References Cited

U.S. PATENT DOCUMENTS

| | | | | | |
|---|---|---|---|---|---|
| 4,402,236 | A | * | 9/1983 | Nishikawa | .................... 74/493 |
| 4,763,957 | A | * | 8/1988 | Poehlmann et al. | ...... 301/110.5 |
| 5,201,242 | A | * | 4/1993 | Chi | ........................... 74/551.1 |
| 5,267,480 | A | * | 12/1993 | Krizan | ........................ 74/493 |
| 5,685,686 | A | * | 11/1997 | Burns | ......................... 414/462 |
| 5,865,560 | A | * | 2/1999 | Mercat et al. | ............ 403/322.4 |
| 6,089,675 | A | | 7/2000 | Schlanger | |
| 6,193,325 | B1 | * | 2/2001 | Lin | ........................ 301/111.03 |
| 6,435,622 | B1 | | 8/2002 | Kanehisa et al. | |
| 6,835,021 | B1 | * | 12/2004 | McMillan | ................. 403/374.4 |
| 7,090,308 | B2 | * | 8/2006 | Rose et al. | ................ 301/110.5 |
| 2004/0084955 | A1 | * | 5/2004 | Denby | ...................... 301/124.2 |
| 2005/0110335 | A1 | | 5/2005 | Rose et al. | |
| 2006/0110335 | A1 | | 5/2006 | Cajan et al. | |

FOREIGN PATENT DOCUMENTS

EP    0 8910 505 B1    7/1997

* cited by examiner

Primary Examiner—Russell D Stormer
(74) Attorney, Agent, or Firm—Global IP Counselors, LLP

(57) ABSTRACT

A bicycle wheel securing structure includes a shaft member, a head member, a first wheel securing device, a second wheel securing device, a first lever member and a second lever member. The shaft member has first and second end portions and a longitudinal center axis. The head member is coupled at the second end portion. The first wheel securing device is positioned at the second end portion. The second wheel securing device positioned at least one of the first and second end portions. The first lever member is operatively connected to the first wheel securing device to move the first wheel securing device in response to movement of the first lever member. The second lever member is operatively connected to the second wheel securing device to move the second wheel securing device in response to movement of the second lever member.

28 Claims, 23 Drawing Sheets

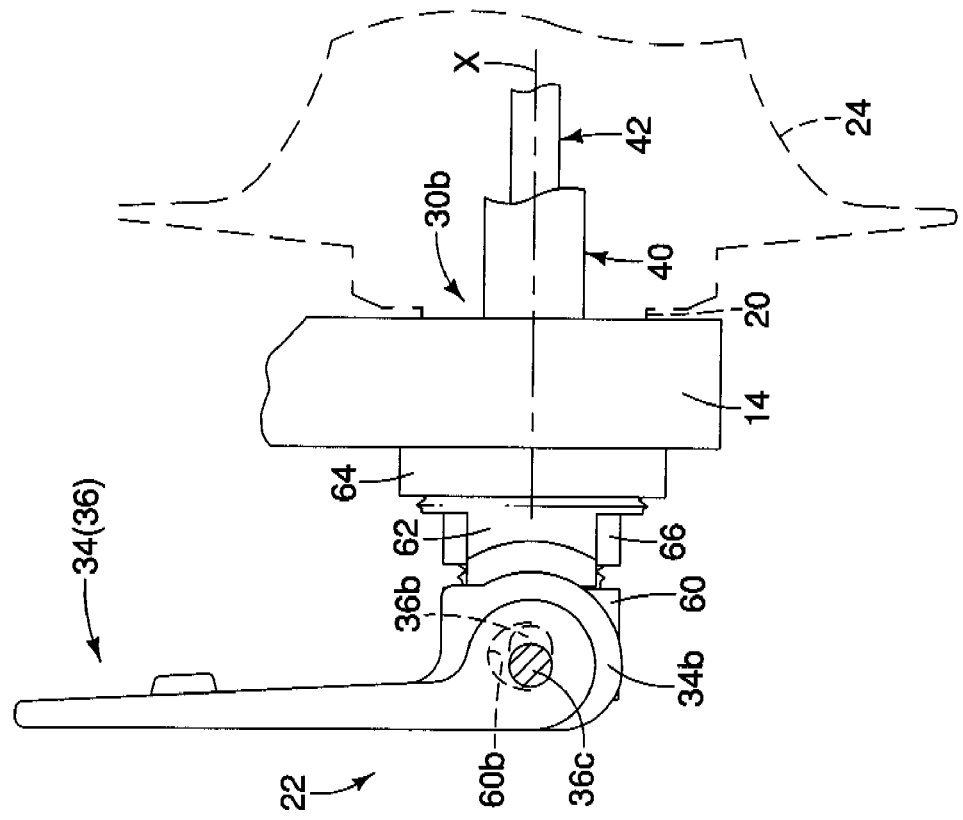
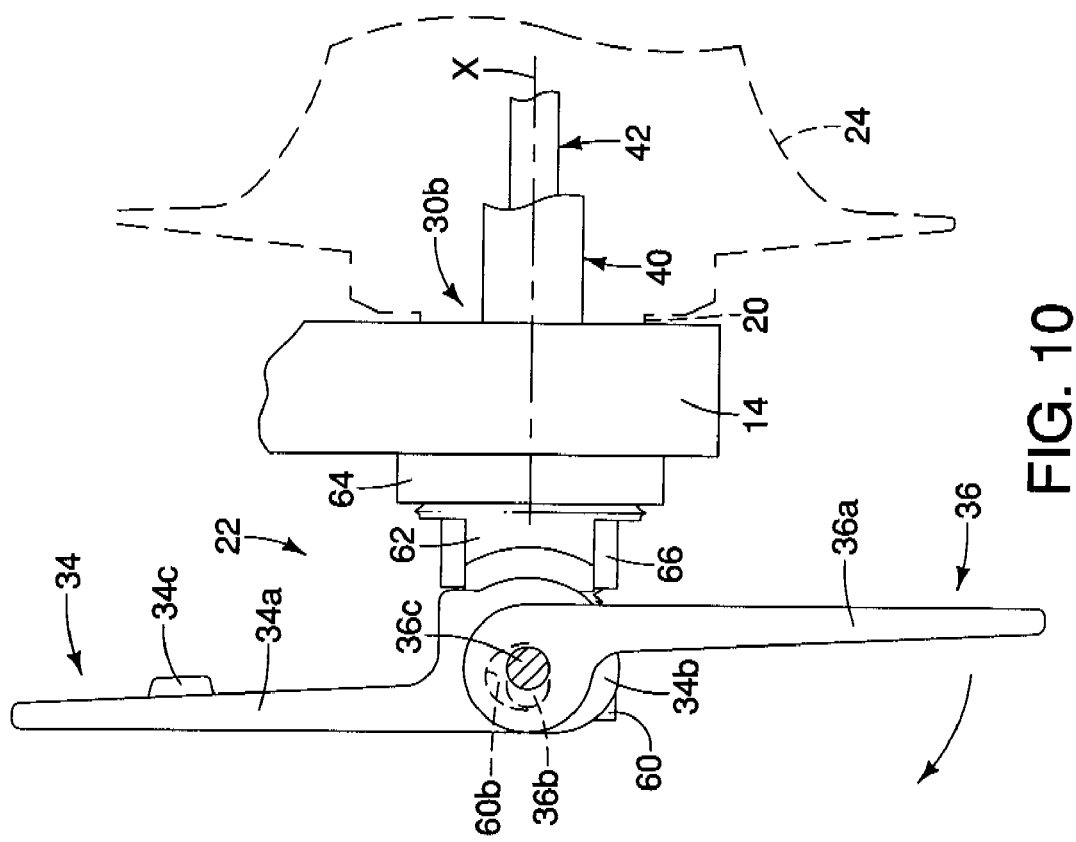
FIG. 11
FIG. 10

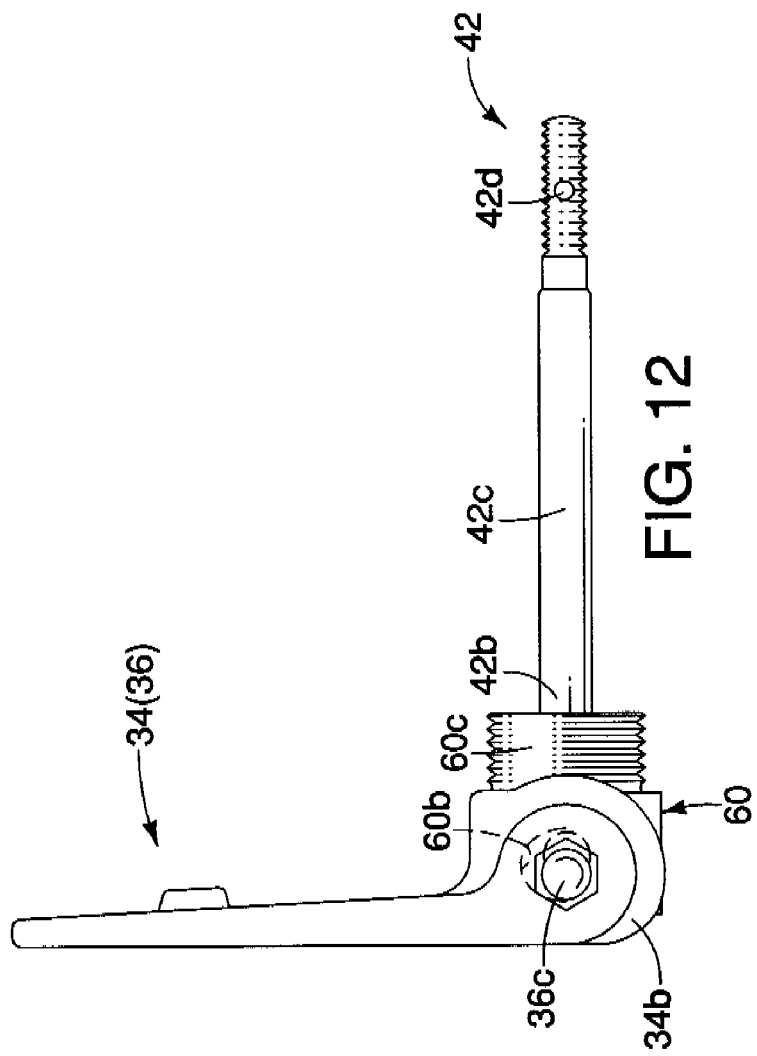
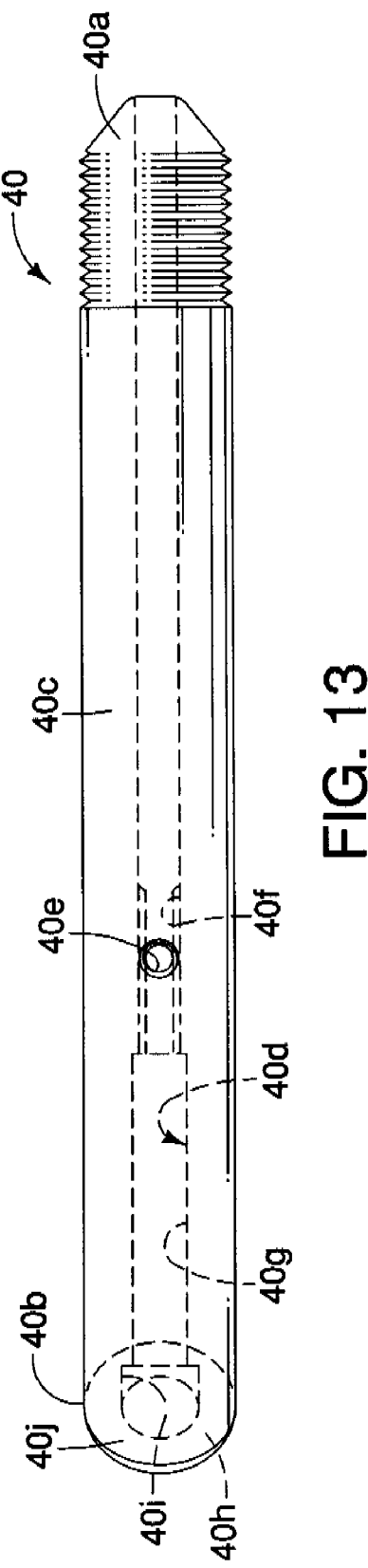
FIG. 12
FIG. 13

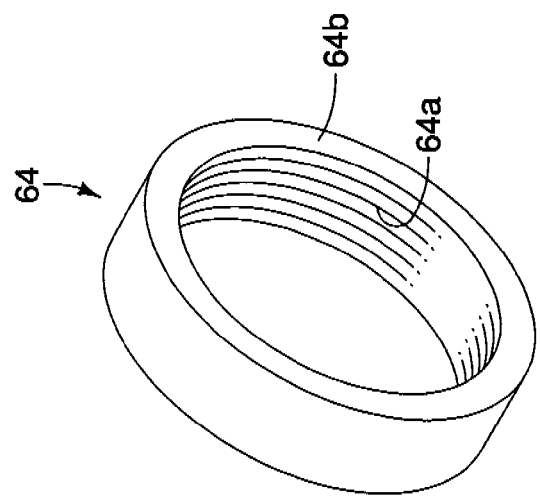
FIG. 15
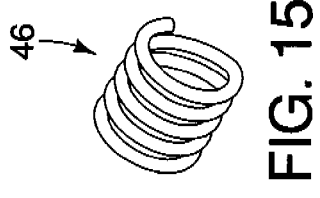
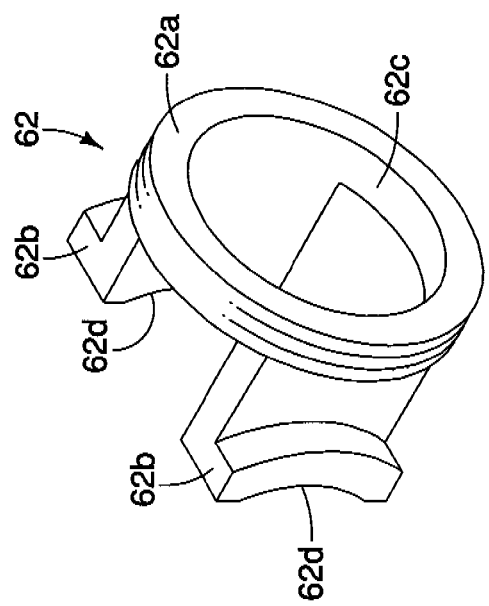
FIG. 17
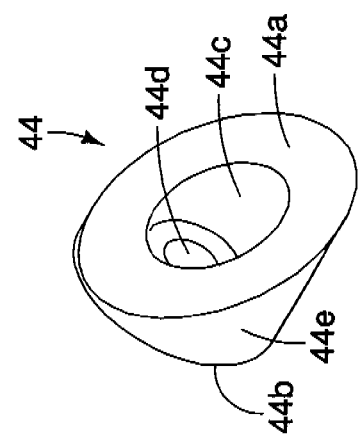
FIG. 14
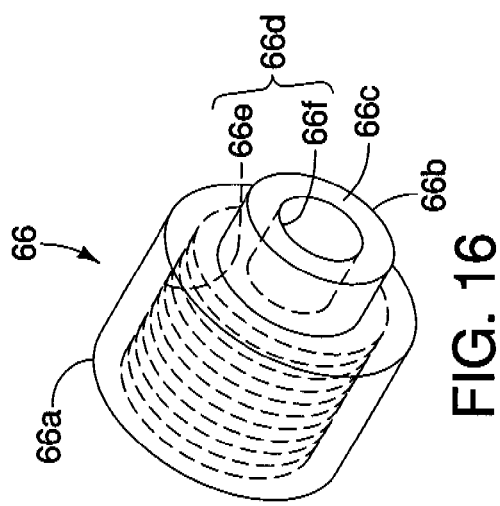
FIG. 16

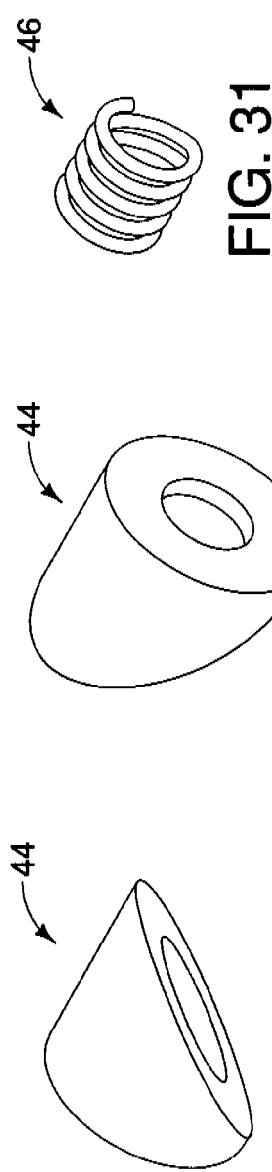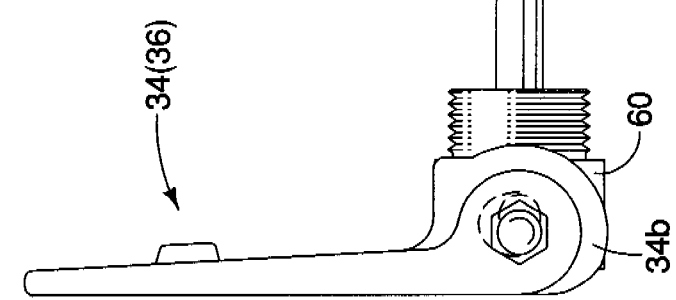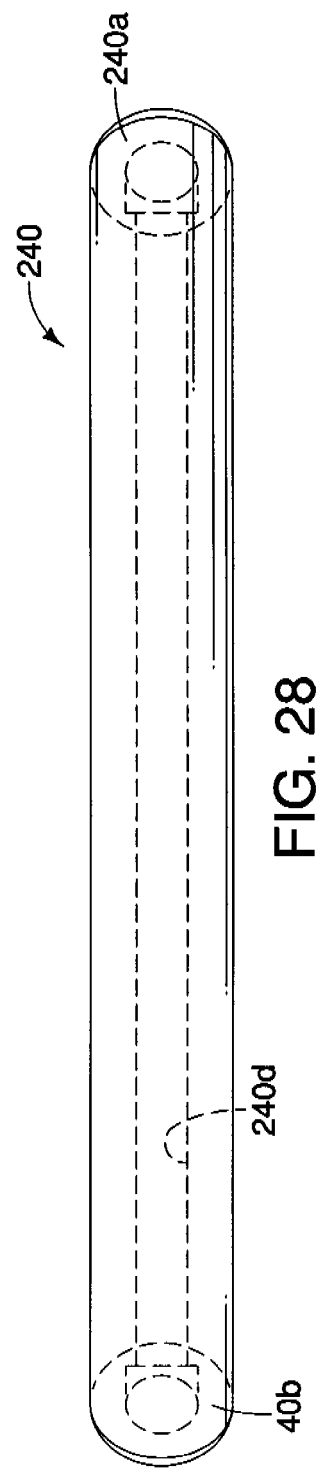

BICYCLE WHEEL SECURING STRUCTURE

BACKGROUND OF THE INVENTION

1. Field of the Invention

This invention generally relates to a bicycle wheel securing structure. More specifically, the present invention relates to a bicycle wheel securing structure, which utilizes a pair of wheel securing devices that are operated by a pair of lever members.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle wheel securing mechanism.

In the past various bicycle parts have been attached using nut and bolt arrangements. However, while certain bicycle parts are designed to be permanently attached to the bicycle, other bicycle parts such as bicycle wheels need to be loosened and removed relatively often. For example, bicycle wheels need to be removed from the frame whenever there is a flat tire. Moreover, bicycle wheels often need to be removed in order to transport a bicycle in an automobile.

Due to the need to remove and reinstall bicycle wheels, bicycle wheel hubs have been provided with wheel securing mechanisms in order to facilitate easier removal and reinstallation of the wheels. A typical wheel securing device includes a skewer with a threaded end having a nut attached thereto and an opposite end having a wheel securing member mounted thereto. The wheel securing member includes a base with a lever and a cam structure. The nut is detachably threaded onto the threaded end of the skewer after the skewer is inserted through the hub body. One of the fork flanges of the frame is arranged between the base of the wheel securing member and the hub body, while the other of the fork flanges is arranged between the nut and the hub body. Thus, the hub can be attached to the frame relatively easily by clamping the fork flanges using the wheel securing lever and nut. Likewise, the hub can be removed from the frame relatively easily by simply releasing the wheel securing lever. While these typical wheel securing mechanisms generally work well, a tighter connection between the hub and the frame has been in demand for some riders.

Thus, bicycle hubs have been designed having an axle with one threaded end that threadedly attaches directly to the bicycle frame. With this type of hub, a knob is provided on the end of the hub axle opposite the threaded end. The knob is used to rotate the axle during installation to both tighten the axle to the frame and to clamp one fork flange between the knob and the hub. With this type of hub, a tighter connection between the hub and the frame is possible as compared to typical wheel securing hubs. However, it can be difficult for some individuals to tighten such a knob. Specifically, with this type of hub, the tightness of the connection between the hub and the frame at least partially depends on the individual installing the hub (i.e., the strength of the individual). In fact, individuals that have difficulty tightening the knob to the desired tightness level may even use a tool in order to achieve the desired level of tightness, which is inconvenient.

In view of the above, it will be apparent to those skilled in the art from this disclosure that there exists a need for an improved bicycle wheel securing structure. This invention addresses this need in the art as well as other needs, which will become apparent to those skilled in the art from this disclosure.

SUMMARY OF THE INVENTION

One object of the present invention is to provide a bicycle wheel securing structure, which provides a tight connection yet is relatively easy to tighten.

Another object of the present invention is to provide a bicycle wheel securing structure, which is relatively simple and inexpensive to manufacture and/or assemble.

The foregoing objects can basically be attained by providing a bicycle wheel securing structure, which comprises a shaft member, a head member, a first wheel securing device, a second wheel securing device, a first lever member and a second lever member. The shaft member has a first end portion and a second end portion with a longitudinal center axis extending therebetween. The head member is coupled to the shaft member at the second end portion of the shaft member. The first wheel securing device is positioned at the second end portion of the shaft member. The second wheel securing device positioned at least one of the first and second end portions of the shaft member. The first lever member is operatively connected to the first wheel securing device to move the first wheel securing device in response to movement of the first lever member. The second lever member is operatively connected to the second wheel securing device to move the second wheel securing device in response to movement of the second lever member.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 10 is a partial longitudinal elevational view of a portion of the frame and the rear hub illustrated in FIGS. 1-2, with the wheel securing axle in a third, partially installed position (i.e. after rotation as illustrated in FIGS. 5 and 6) and after moving the first wheel securing lever to the first fixing position but prior to moving the second wheel securing lever second fixing position;

FIG. 11 is a partial longitudinal elevational view of a portion of the frame and the rear hub illustrated in FIGS. 1-2, with the wheel securing axle fully installed (i.e. with both the first and second wheel securing levers in the first and second fixing positions, respectively);

FIG. 12 is a longitudinal elevational view of the wheel securing head and inner axle assembly illustrated in FIGS. 2-11;

FIG. 13 is a longitudinal elevational view of the outer axle of the wheel securing axle illustrated in FIGS. 2-11;

FIG. 14 is an enlarged perspective view of the expansion member of the wheel securing axle illustrated in FIGS. 2-11;

FIG. 15 is an enlarged perspective view of the biasing spring of the outer axle of the wheel securing axle illustrated in FIGS. 2-11;

FIG. 16 is an enlarged perspective view of an inner adjustment part of the wheel securing axle illustrated in FIGS. 2-11;

FIG. 17 is an enlarged perspective view of an outer adjustment part of the wheel securing axle illustrated in FIGS. 2-11;

FIG. 18 is an enlarged perspective view of another outer adjustment part of the wheel securing axle illustrated in FIGS. 2-11;

FIG. 27 is a longitudinal elevational view of the wheel securing head and inner axle assembly illustrated in FIGS. 20-26

FIG. 28 is a longitudinal elevational view of the outer axle of the wheel securing axle illustrated in FIGS. 20-26;

FIG. 29 is an enlarged perspective view of one expansion member of the wheel securing axle illustrated in FIGS. 20-26;

FIG. 30 is an enlarged perspective view of another expansion member of the wheel securing axle illustrated in FIGS. 20-26;

FIG. 31 is an enlarged perspective view of one of the biasing springs of the outer axle of the wheel securing axle illustrated in FIGS. 20-26;

DETAILED DESCRIPTION OF THE PREFERRED EMBODIMENTS

Figure 1:
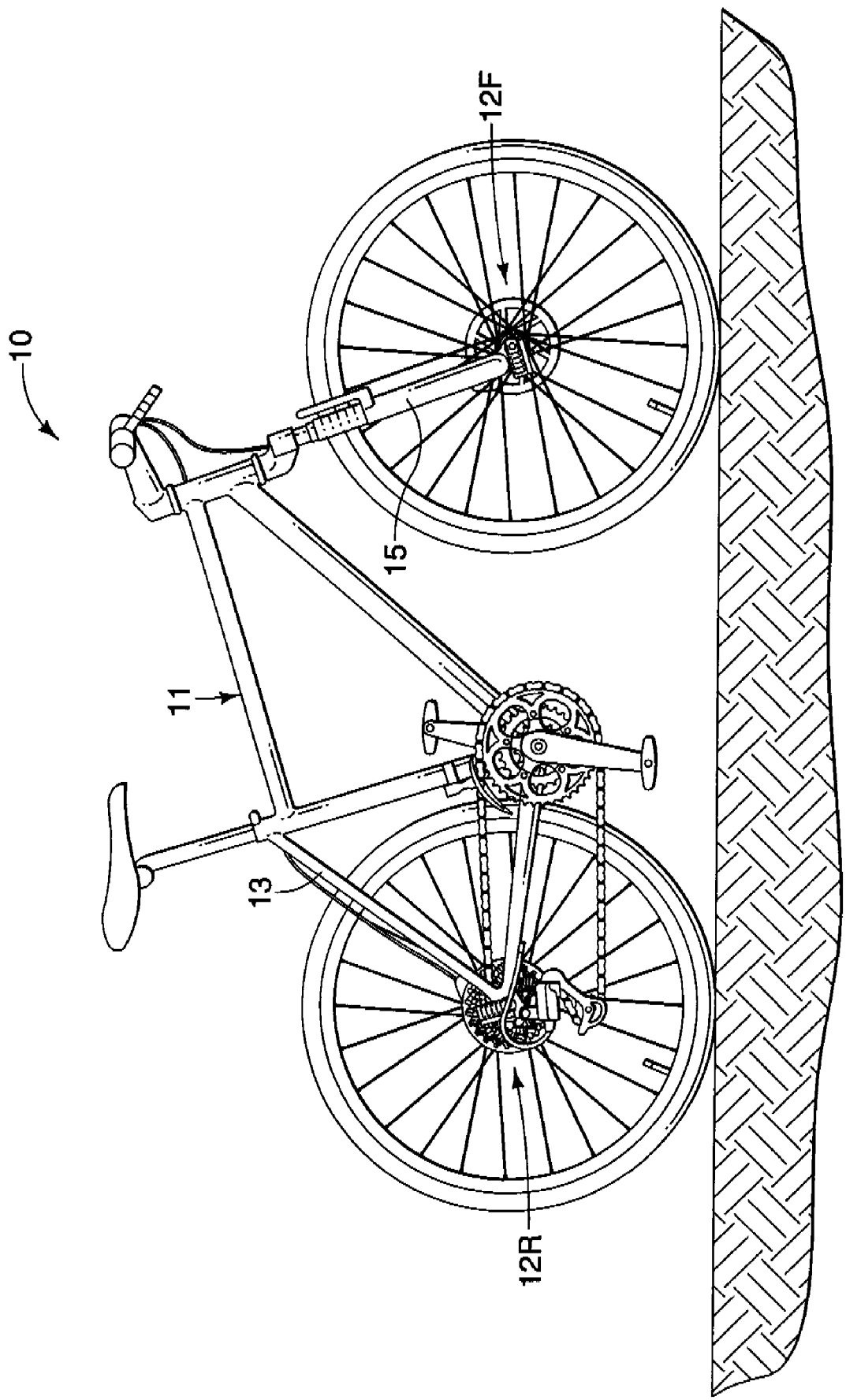
FIG. 1 is a side elevational view of a bicycle with a rear bicycle hub and a front bicycle hub coupled thereto in accordance with a first embodiment of the present invention.
Figure 2:
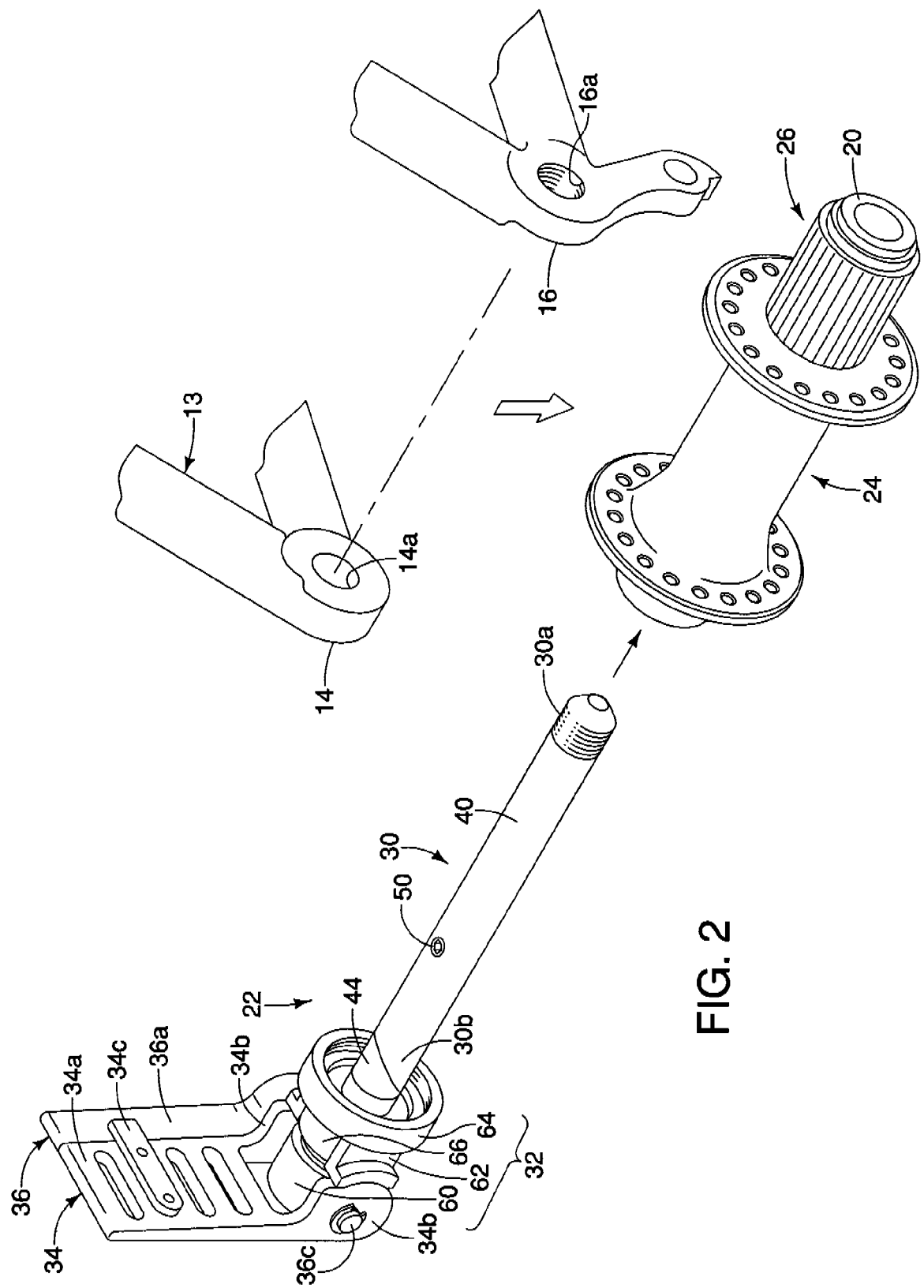
FIG. 2 is an enlarged, exploded perspective view of a portion of the frame and the rear hub illustrated in FIG. 1.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1-3 and 19, a bicycle 10 is illustrated, which has a rear bicycle hub 12R and a front bicycle hub 12F coupled thereto in accordance with one preferred embodiment of the present invention. The rear hub 12R is attached the frame 11 of the bicycle 10 using a wheel securing axle 22 in accordance with the present invention. Specifically, the frame 11 includes a rear fork or triangle 13 with a pair of hub mounting flanges 14 and 16 formed at the free ends thereof. Preferably, one end of the wheel securing axle 22 is directly threadedly attached to the mounting flange 16, while the other end has a wheel securing mechanism that is used to securely attach the wheel securing axle 22 to the other mounting flange 14. The front hub 12F is attached the frame 11 of the bicycle 10 using a wheel securing axle 22' in accordance with the present invention in a manner substantially identical to the rear hub 12R, as explained below.

The bicycle 10 is conventional, except for the rear hub 12R having the wheel securing axle 22 and the front hub 12F having the wheel securing axle 22'. Accordingly, the bicycle 10 and its various components will not be discussed and/or illustrated in detail herein, except as related to the rear hub 12R having the wheel securing axle 22 the front hub 12F having the wheel securing axle 22' of the present invention.

Moreover, it will be apparent to those skilled in the bicycle art from this disclosure that various modifications can be made to the bicycle 10 and its components without departing from the present invention. The rear hub 12R will be explained first.

Referring to FIGS. 2-11, the rear bicycle hub 12R includes a main hub axle 20, the wheel securing axle 22, a hub assembly 24 and a freewheel 26. The rear hub 12R is conventional, except for the wheel securing axle 22. Accordingly, the rear hub 12R will not be discussed and/or illustrated in detail herein, except as related to the wheel securing axle 22 of the present invention. A hub shell (outline shown in broken lines) of the hub assembly 24 and the free wheel 26 are rotatably supported on the main hub axle 20 of the rear hub 12R via a bearing assembly and/or other conventional parts in a conventional manner. The wheel securing axle 22 extends through the main hub axle 20. Thus, forward rotation of rear sprockets mounted on the free wheel 26 transmits torque to the hub assembly 24. The hub assembly 24 is coupled to the rear rim via a plurality of spokes in a conventional manner to transmit the forward rotation of the hub assembly 24 to the rear rim and tire.

Referring to FIGS. 2-18, the bicycle wheel securing axle 22 basically includes a shaft member 30, a head member 32 and a pair of (first and second) wheel securing lever members 34 and 36. The shaft member 30 extends through the main hub axle 20. In this embodiment, the head member 32 is attached to one end of the shaft member 30, and the lever members 34 and 36 are coupled to the head member 32. In this embodiment, the other end of the shaft member 30 is directly threadedly attached to the frame 11, as explained in more detail below.

Figure 6:
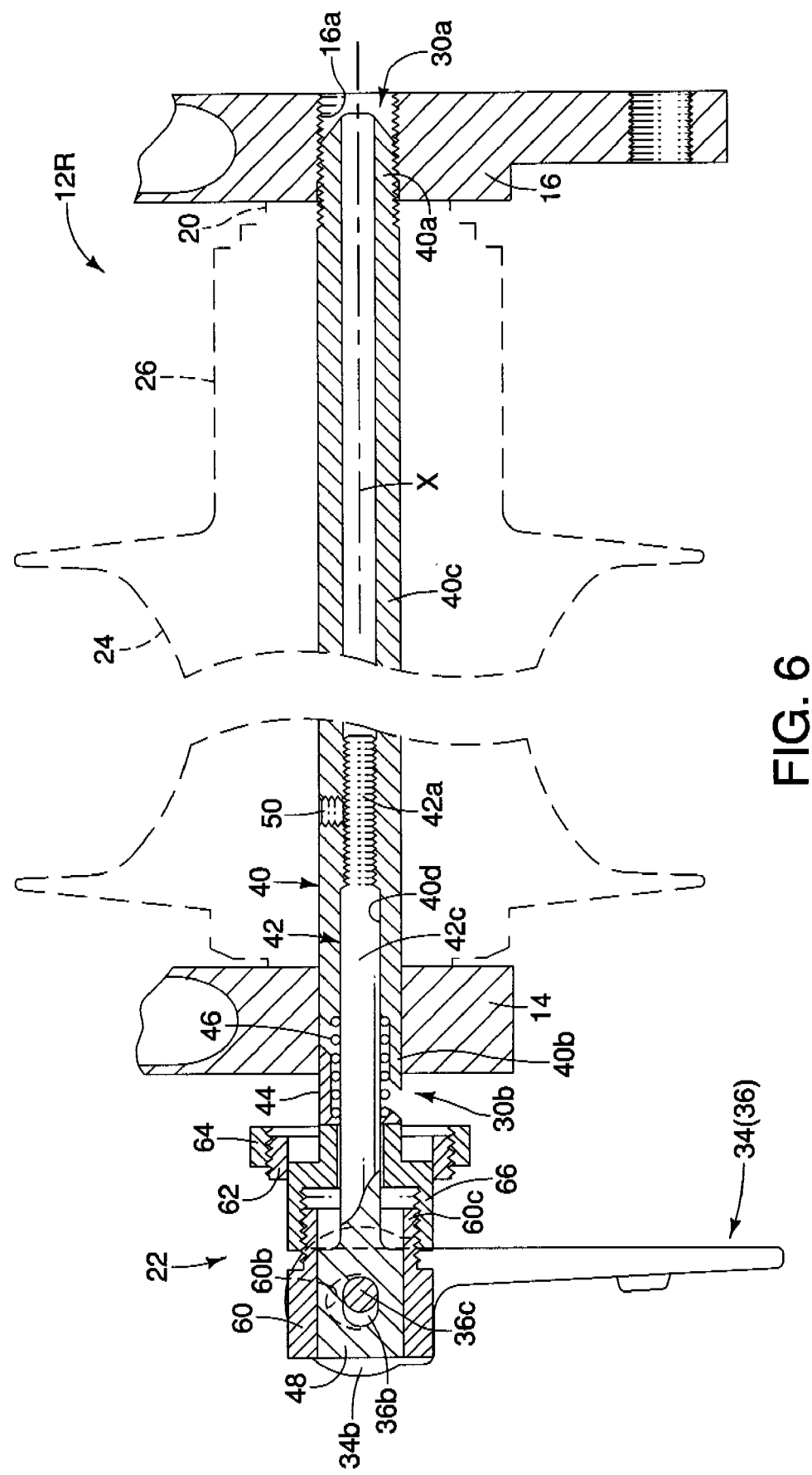
FIG. 6 is an enlarged, partial cross-sectional view of a portion of the frame and the rear hub illustrated in FIGS. 1-2, with the wheel securing axle in a second, partially installed position (i.e. during rotation illustrated in FIG. 5)
Figure 7:
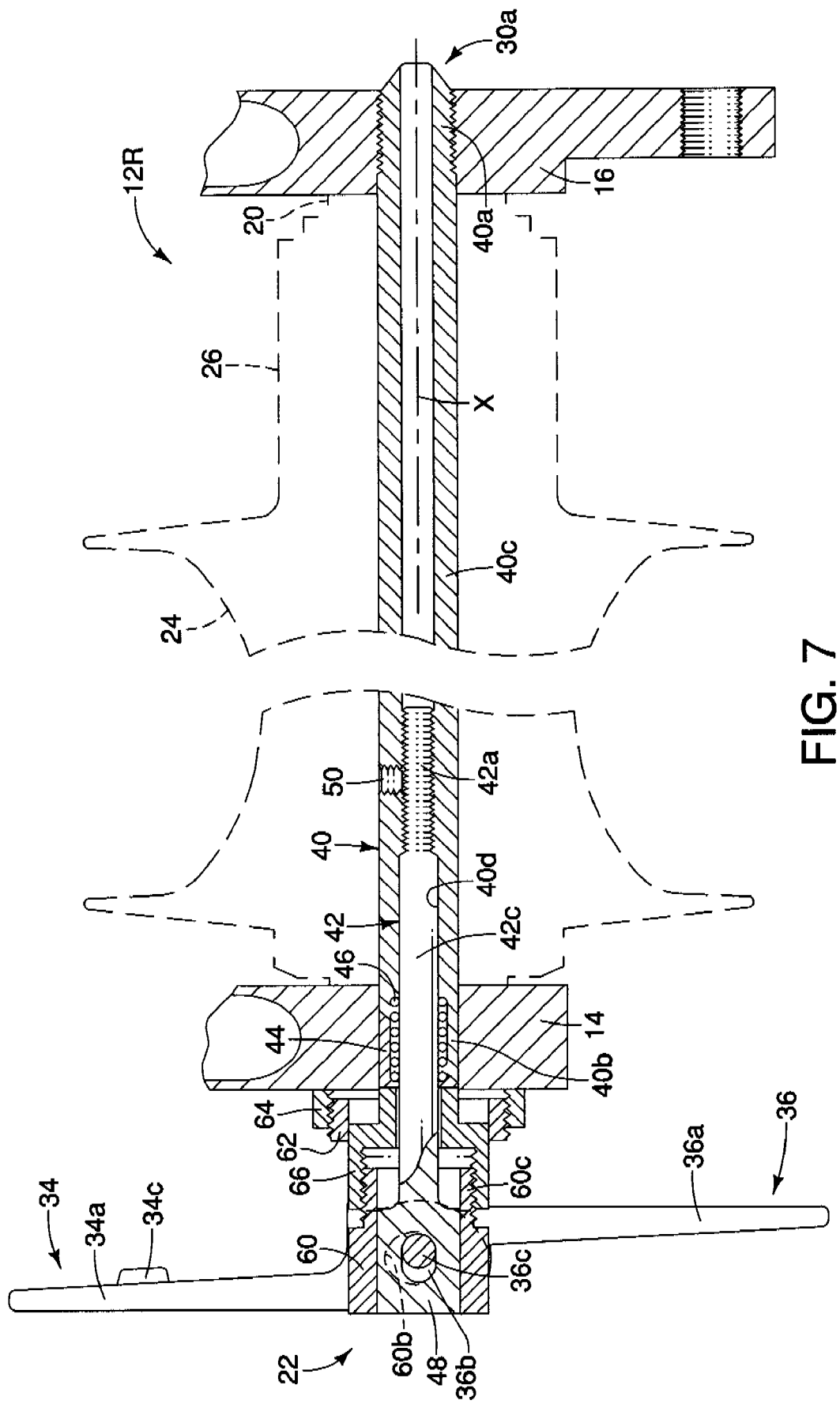
FIG. 7 is an enlarged, partial cross-sectional view of a portion of the frame and the rear hub illustrated in FIGS. 1-2, with the wheel securing axle in a third, partially installed position (i.e. after rotation as illustrated in FIGS. 5 and 6) and after moving the first wheel securing lever to the first fixing position but prior to moving the second wheel securing lever to the second fixing position.
Figure 8:
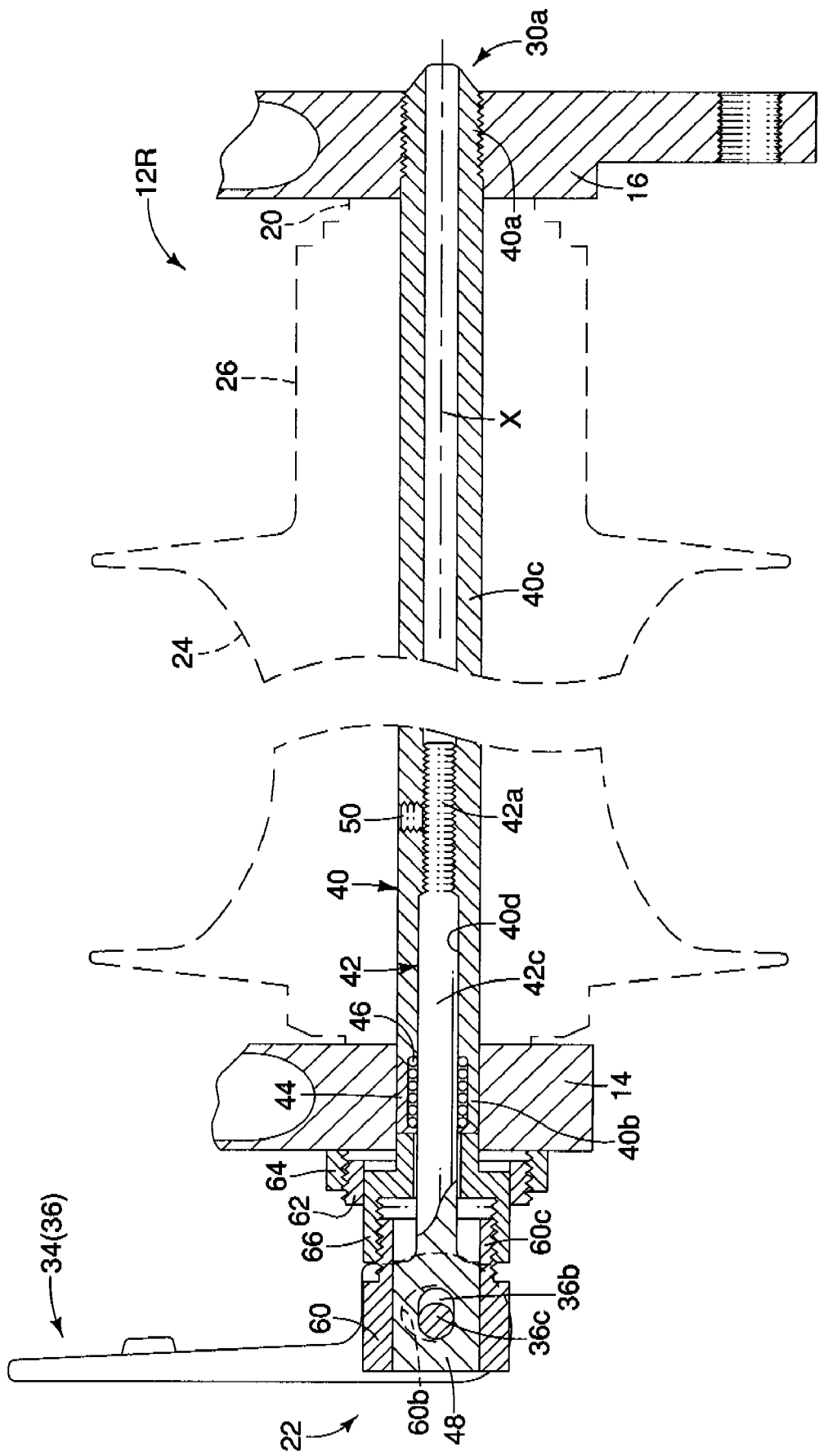
FIG. 8 is an enlarged, partial cross-sectional view of a portion of the frame and the rear hub illustrated in FIGS. 1-2, with the wheel securing axle fully installed (i.e. with both the first and second wheel securing levers in the first and second fixing positions, respectively)

The (first) wheel securing lever member 34 has an external cam, which moves a (first) wheel securing device in response to movement of the lever member 34. The (second) wheel securing lever member 36 has an internal cam, which moves another (second) wheel securing device in response to movement of the lever member 36. In the illustrated embodiment, the (first and second) lever members 34 and 36 are at least partially independently movable relative to each other to move parts of the (first and second) wheel securing devices at least partially independently of each other, as explained below. In the illustrated embodiment, movement of the (first) lever member 34 from a (first) release position to a (first) fixing position applies an axial force, as shown in FIGS. 6 and 7. On the other hand, movement of the (second) lever member 36 from a (second) release position to a (second) fixing position radially expands the shaft member 30, as seen in FIGS. 7 and 8. Operation of the (first and second) lever members 34 and 36 to move the (first and second) wheel securing devices will be explained in more detail below.

Referring to FIGS. 2-4 and 6-13, the shaft member 30 is constructed is several parts that are attached together. When assembled, the shaft member 30 has a first threaded end portion 30a and a second end portion 30b with a longitudinal center axis X extending between the first and second end portions 30a and 30b, as seen in FIGS. 2-5. A direction parallel to the longitudinal center axis X will be considered an axial/longitudinal direction, while a direction perpendicular to the longitudinal center axis X will be considered a transverse direction. Numerous radially extending lines extend radially between the longitudinally center axis X and an imaginary circle (cylinder) concentrically disposed about the longitudinal center axis X.

The first threaded end portion 30a is designed to be directly threadedly attached to the mounting flange 16. The head member 32 is coupled to the second end portion 30b such that the second end portion 30b supports the head member 32. The lever members 34 and 36 are operatively connected to the first and second wheel securing devices to move the shaft member 30 and parts of the head member 32 axially relative to each other in response to movement of the lever members 34 and 36, as explained below.

Referring to FIGS. 2-15, the shaft member 30 basically includes an outer axle 40, an inner axle 42, a radial expansion member or part 44 and a biasing member 46. The inner axle 42 is releasably attached within the outer axle 40 in an installed position, as seen in FIGS. 4 and 6-9. The outer axle 40 and the inner axle 42 are preferably releasably attached together via a threaded connection to releasably prevent axial removal of the inner axle 42 from the outer axle 40 when the inner axle 42 is in the installed position. The expansion part 44 is slidably disposed on the inner axle 42 adjacent one end of the outer axle 40. The biasing member 46 is axially disposed between the outer axle 40 and the expansion part 44 to bias these parts out of engagement with each other.

Referring to FIGS. 2-4, 6-9 and 13, the outer axle 40 basically includes a first externally threaded axial end 40a, a second axial end 40b, an outer rod portion 40c, an internal bore 40d and a transverse threaded bore 40e. The outer rod portion 40c extends between the first and second axial ends 40a and 40b, and preferably has an external surface with a substantially uniform, circular shape. The threaded axial end 40a forms the first end portion 30a of the shaft member 30 when the shaft member 30 is fully assembled. Thus, the threaded axial end 40a is preferably directly threadedly attached to the mounting flange 16. The second axial end 40b is attached to the mounting flange 14. The second axial end 40b together with part(s) of the inner axle 42, the expansion part 44 and the biasing member 46 constitute parts of the second end portion 30b of the shaft member 30 when the shaft member 30 is fully assembled. The outer axle 40 preferably has a circular external shape, as viewed along the center axis X, as best understood from FIG. 3. The outer axle 40 is preferably constructed of a lightweight rigid material such as a metallic material utilizing conventional manufacturing techniques such as casting and/or machining. In this embodiment, the outer axle 40 is preferably constructed as a one-piece, unitary member.

The mounting flange 16 has a threaded bore 16a that is preferably a closed bore with a continuous annular female threads (i.e., preferably not a slot), which receives the first axial threaded end 40a. In this embodiment, the threaded bore 16a has an unthreaded section that receives an unthreaded part of the outer axle 40 therein. The mounting flange 14 has an unthreaded bore 14a that is preferably a closed bore with a continuous annular surface (i.e., preferably not a slot), which receives the second axial end 40b. The outer axle 40 of the shaft member 30 is preferably dimensioned and tightened to the mounting flange 16 such that a free edge of the second axial end 40b of the outer axle 40 does not project beyond an outer axially facing surface of the mounting flange 14, as seen in FIGS. 7 and 8.

Of course, it will be apparent to those skilled in the art from this disclosure that the bore 16a could be completely threaded and additional threads could be provided on the threaded axial end 40a, but still resulting in the position of the second axial end 40b as illustrated herein, if needed and/or desired. Moreover, it will be apparent to those skilled in the art from this disclosure that the preceding arrangement could be further modified with even longer threads at the threaded axial end 40a being provided such that the position of the second axial end 40b is more adjustable relative to the flange 14 and/or such that the wheel securing axle can be used with mounting flanges of varying thicknesses/spacing, if needed and/or desired. In any case, the threaded axial end 40a, the threaded bore 16a, the spacing/thickness of the mounting flanges 14 and 16 as well as the overall length of the outer axle 40 are preferably dimensioned such that the free edge of the second axial end 40b will not project out of the mounting hole 14a.

Referring to FIG 13, the internal bore 40d is a stepped, through bore with a central threaded section 40f and an enlarged unthreaded section 40g extending from the threaded section 40f to an open end at the second axial end 40b. The inner axle 42 is threadedly attached to the threaded section 40f of the internal bore 40d. The inner axle 42 extends out of the unthreaded section 40g of the internal bore 40d. Thus, the inner axle 42 extends from the second axial end 40b of the outer axle 40 when the inner axle 42 is in the installed position. The head member 32 is preferably attached to an end of the inner axle 42 extending out of the internal bore 40d, as explained below. The stepped internal bore 40d preferably has a circular internal shape, as viewed along the center axis X.

A set screw 50 is preferably threadedly mounted in the transverse threaded bore 40e to releasably prevent relative rotation of the inner axle 42 within the internal bore 40d when the inner axle 42 is in the installed position, as explained below. Thus, the set screw 50 is preferably disposed between the outer axle 40 and the inner axle 42 to releasably prevent relative rotation of the inner axle 42 within the internal bore 40d when the inner axle 42 is in the installed position. The transverse threaded bore 40e extends between an external surface of the outer axle 40 and the internal bore 40d.

Referring to FIG. 13, the second axial end 40b has an inclined (second end) surface 40h and a (second) spring receiving recess 40i extending axially from the inclined surface 40h. The biasing member 46 is preferably a coiled compression spring with one end received in the recess 40i. The recess 40i preferably has a larger diameter than the unthreaded section 40g of the blind bore 40d such that the inner axle 42 is slidably received through the biasing member 46. The inclined surface 40h cooperates with the expansion part 44 to provide a radial securing force at the second end portion 30b, as explained below.

Referring to FIGS. 2-4, 6-9 and 12, the inner axle 42 basically includes a first threaded end 42a, a second end 42b, an inner rod portion 42c and a bracket 48. The first threaded end 42a is threadedly attached to the threaded section 40f of the internal bore 40d. The first threaded end 42a and the threaded section 40f constitute parts of a threaded connection between the outer and inner axles 40 and 42 when coupled together. The a second end 42b extends out of the unthreaded section 40g of the internal bore 40d. The second end 42b supports the head member 32. Specifically, the second end 42b of the inner axle 42 has the bracket 48 attached thereto, which supports the head member 32. The inner rod portion 42c extends between the first and second ends 42b and 42c.

The inner axle 42 preferably has a circular shape as viewed along the center axis X, except for the bracket 48 arranged on the second end 42b. The second end 42b extends out of the internal bore 40d, as best understood from FIGS. 3, 4 and 6. The inner axle 42 is preferably constructed of a lightweight rigid material such as a metallic material utilizing conventional manufacturing techniques such as casting and/or machining. In this embodiment, the inner axle 42 can constructed as a one-piece, unitary member together with the bracket 48, or the bracket 48 can be constructed as a separate member that is fixed to the inner axle 42 (e.g. by welding or the like). The bracket 48 preferably has a longitudinal slot, which receives part of the lever member 34 therethrough, as explained below.

Referring to FIGS. 13 and 14, the radial expansion part 44 basically includes an inclined (first end) surface 44a, a second axial end surface 44b, a (first) spring receiving recess 44c and an axle receiving hole 44d. The spring receiving recess 44c extends axially from the inclined surface 44a, while the axle receiving hole 44d extends axially from the second axial end surface 44b to the spring receiving recess 44c. The axle receiving hole 44d is slightly larger than the inner rod section 42c. The inclined surface 44a has an inclination identical to the inclined surface 40h, e.g. about forty-five degrees. The expansion part 44 is preferably constructed of a lightweight rigid material such as a metallic material utilizing conventional manufacturing techniques such as casting and/or machining. In this embodiment, the expansion part 44 is constructed as a one-piece, unitary member.

Figure 3:
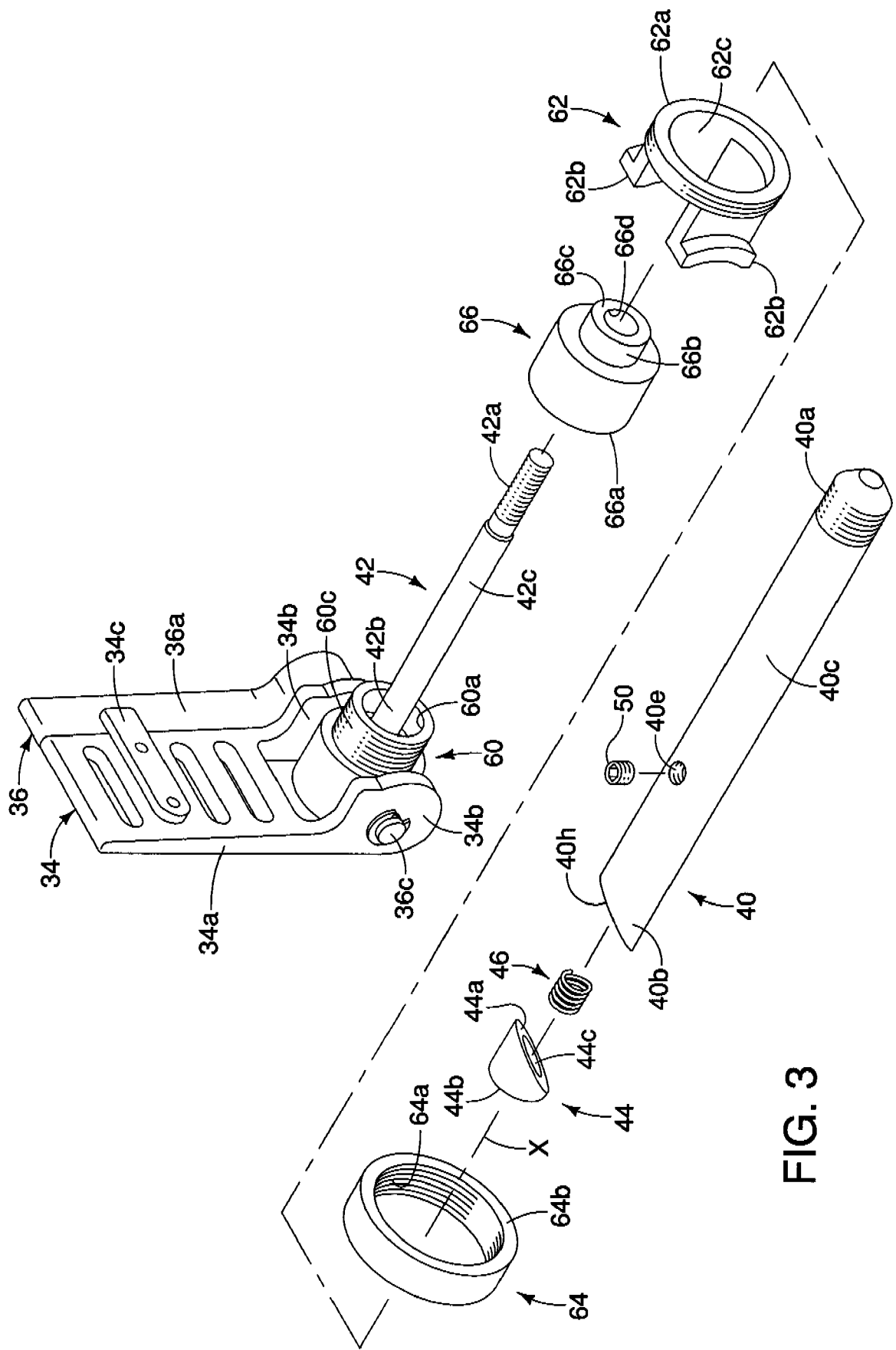
FIG. 3 is an exploded, perspective view of the wheel securing axle of the rear hub illustrated in FIG. 2.
Figure 4:
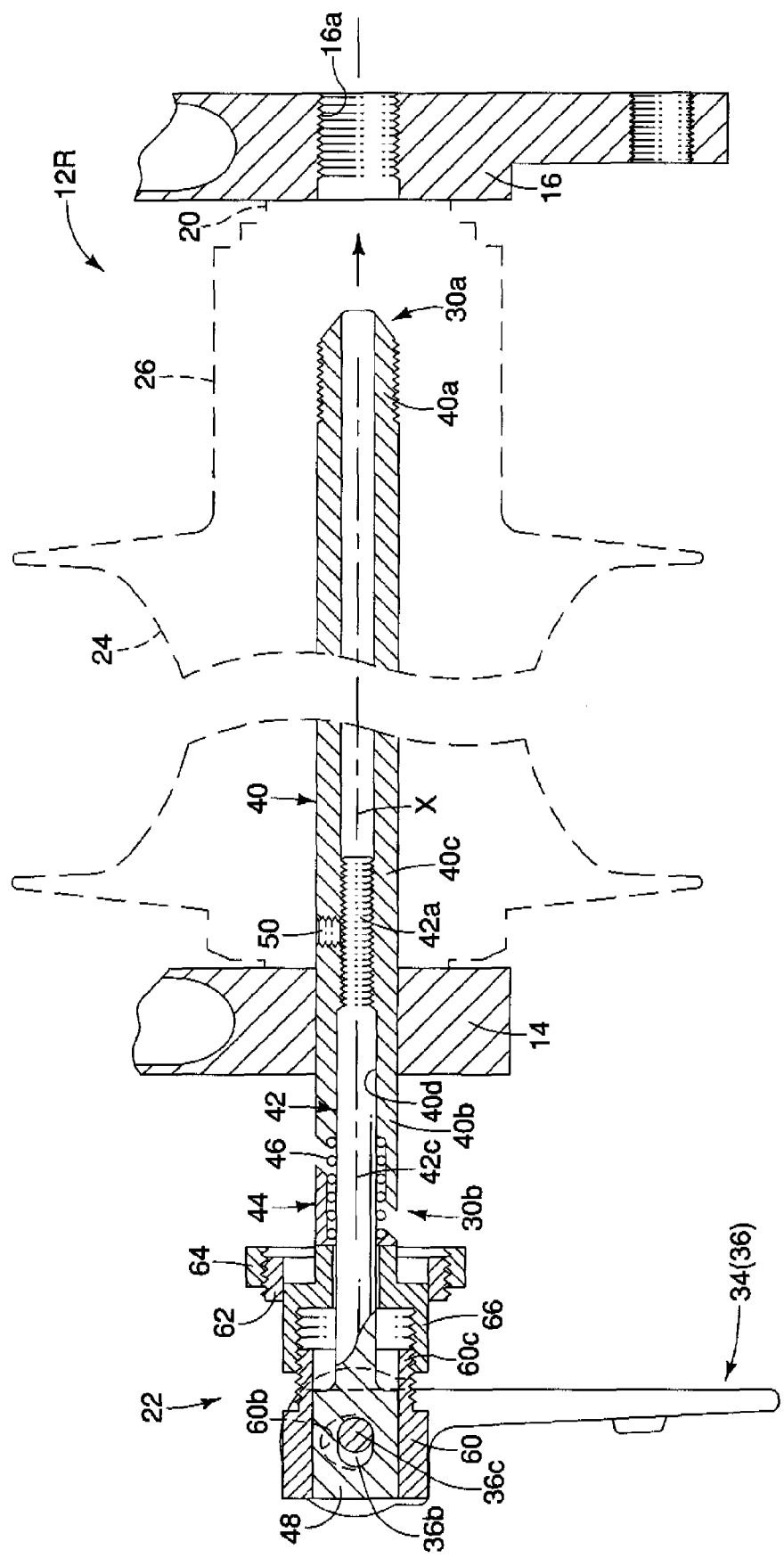
FIG. 4 is an enlarged, partial cross-sectional view of a portion of the frame and the rear hub illustrated in FIGS. 1-2, with the wheel securing axle in a first, partially installed position.
Figure 5:
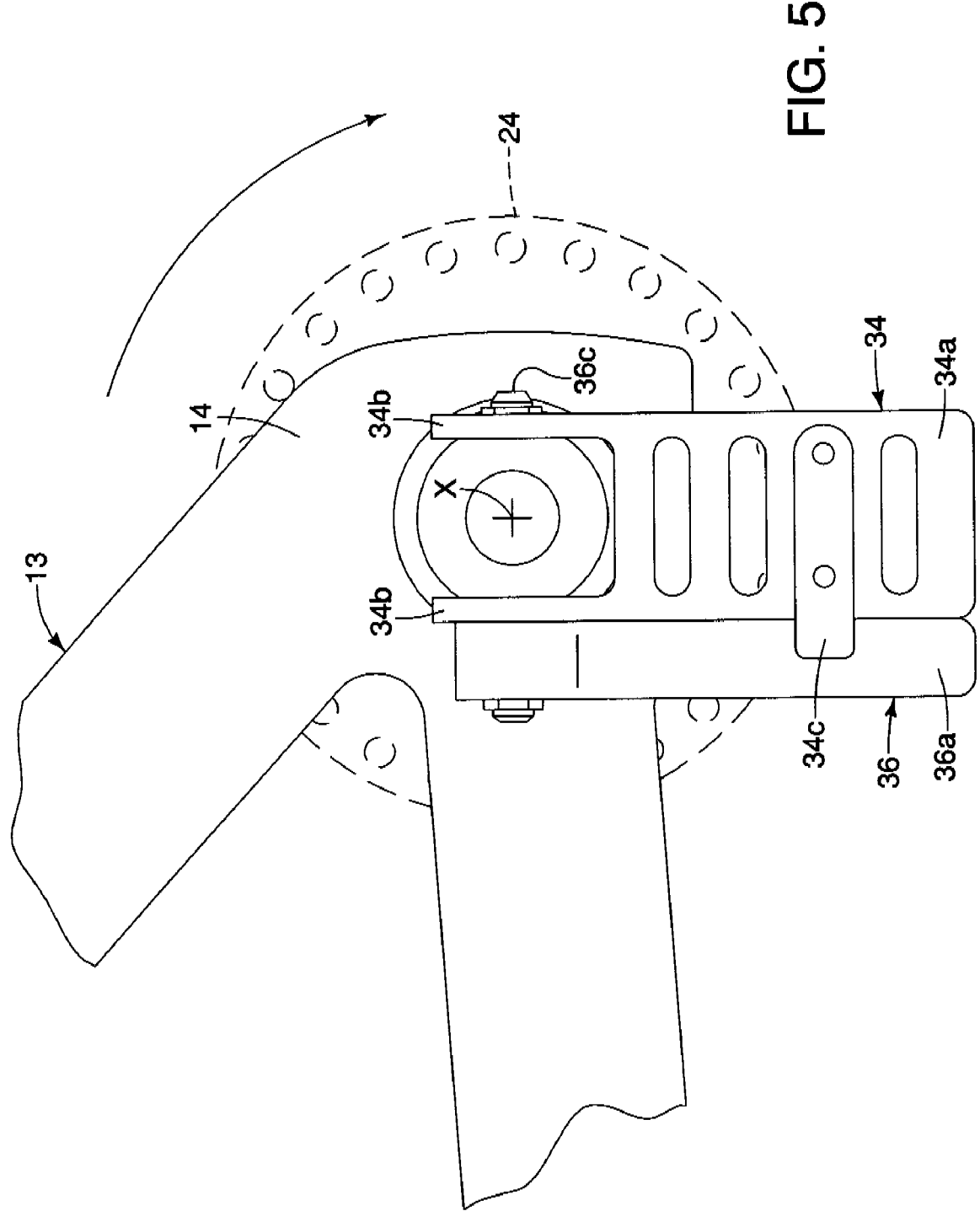
FIG. 5 is an enlarged, end elevational view of the portion of the frame and the rear hub illustrated in FIG. 4, illustrating rotation of the wheel securing axle from the first, partially installed position.

As seen in FIGS. 3 and 4, the expansion part 44 and the second axial end 40b of the outer axle 40 constitute parts of a radial expansion structure with an outer diameter defined by an outer surface 44e of the expansion part 44 and an outer surface 40j of the second axial end 40b. The inclined surfaces 40h and 44a cooperate with each other to radially expand the outer diameter of the radial expansion structure in response to relative axial movement of the expansion part 44 toward the threaded axial end 40a, which is occurs in response to movement of the (second) lever member 36 from a release position to an attachment position as seen in FIG. 8. Relative axial movement between the expansion part 44 and the second axial end 40b causes at least one of the outer surfaces 44e and 40j to move radially outwardly to expand the outer diameter of the radial expansion structure. The biasing member 46 normally biases the inclined surfaces 40h and 44a axially away from (out of contact with) each other so that the radial expansion structure is normally biased toward a non-expanded state as seen in FIGS. 6 and 7.

The set screw 50 is arranged to selectively contact an external surface of the inner axle 42 when the set screw 50 is tightened, as shown in FIGS. 4 and 6-8. Specifically, the set screw 50 is threadedly (adjustably) mounted in the transverse threaded bore 40e, as mentioned above. Thus, the end of the set screw 50 frictionally prevents rotation of the inner axle 42 relative to the outer axle 40 when tightened against the external surface of the inner axle 42. Optionally, the external surface of the inner axle 42 may include a recess or dented area 42d, such as that illustrated in FIG. 12. With such an arrangement, the inner axle 42 can further be prevented from rotating relative to the outer axle 40 when the internal end of the set screw 50 is received in the dented area 42d.

Referring to FIGS. 2-12 and 16-18, the head member 32 will now be explained in more detail. The head member 32 includes a main body part 60, an auxiliary body part 62, an outer adjustment part 64 and an inner adjustment part 66. The main body part 60 is supported on the bracket 48 of the inner axle 42. The inner adjustment part 66 is threadedly attached to the main body part 60. The auxiliary body part 62 is slidably supported on the inner adjustment part 66. The outer adjustment part 64 is threadedly attached to the auxiliary body part 62. Thus, the axial position of the inner adjustment part 66 relative to the main body part 60 can be adjusted by rotating the inner adjustment part 66 relative to the main body part 60. Likewise, the axial position of the outer adjustment part 64 relative to the auxiliary body part 62 can be adjusted by rotating the outer adjustment part 64 relative to the auxiliary body part 62.

Referring to FIGS. 6 and 7, the auxiliary body part 62 and the outer adjustment part 64 move axially relative to the shaft member 30 toward the first end portion 30a when the (first) lever member 34 is moved from the (first) release position, as seen in FIG. 6, to the (first) fixing position, as seen in FIG. 7. Thus, the outer adjustment part 64 axially contacts the mounting flange 14 to apply an axial (clamping) force to the mounting flange 14 to secure the rear hub 12R to the mounting flanges 14 and 16, as seen in FIG. 7. The main body part 60 and the inner adjustment part 66 substantially remain stationary with respect to the shaft member 30 when the lever member 34 is moved from the (first)release position, as seen in FIG. 6, to the (first) fixing position, as seen in FIG. 7. The lever member 34 is preferably moved from the (first) release position, as seen in FIG. 6, to the (first) fixing position, as seen in FIG. 7, before moving the lever member 36.

Referring to FIGS. 7 and 8, the main body part 60 and the inner adjustment part 66 move axially relative to the shaft member 30 toward the first end portion 30a when the (second) lever member 36 is moved from the (second) release position, as seen in FIG, 7 to the (second) fixing position, as seen in FIG. 8. Thus, the inner adjustment part 66 axially contacts the expansion part 44 to cause radial expansion of the radial expansion structure (i.e. to radial expand an outer diameter of the shaft member 30 at the second end portion 30b within the mounting flange 14) to further secure the rear hub 12R to the mounting flanges 14 and 16. The auxiliary body part 62 and the outer adjustment part 64 substantially remain stationary with respect to the shaft member 30 when the lever member 36 is moved from the (second) release position, as seen in FIG. 7, to the (second) fixing position, as seen in FIG. 8. The lever member 36 is moved to the (second) fixing position, as seen in FIG. 8 after moving the lever member 34 to the (first) fixing position, as seen in FIG. 7. Accordingly, the lever member 34 and 36 move at least partially independently of each other to move the auxiliary body part 62 and the main body part 60 at least partially independently of each other.

Referring to FIGS. 9 and 16-18, the main body part 60 is basically a cup-shaped member having an internal recess 60a, a pair of eccentrically shaped cam openings 60b and a threaded section 60c. The bracket 48 of the inner axle 42 is received in the recess 60a with part of the lever member 34 extending through the main body part 60 and the bracket 48. The threaded section 60c preferably has a tubular configuration with external (male) threads. The inner adjustment member 66 is threaded onto the externally threaded section 60c. The cam openings 60b receive mating parts of the lever member 36 therein to move the main body part 60 in response to movement of the lever member 36, as explained below. The main body part 60 is preferably constructed of a lightweight rigid material such as a metallic material utilizing conventional manufacturing techniques such as casting and/or machining.

Referring to FIG. 16, the inner adjustment part 66 is preferably a stepped tubular member having an attachment portion 66a, an abutment portion 66b with an axially facing abutment surface 66c and a stepped internal bore 66d having an enlarged threaded section 66e and an unthreaded section 66f. The threaded section 66e is formed in the enlarged attachment portion 66a such that the attachment portion 66a is threadedly mounted on the threaded section 60c of the main body part 60. Thus, the inner adjustment part 66 normally moves axially with the main body part 60. However, the axial position of the inner adjustment part 66 relative to the main body part 60 can be adjusted by rotating the inner adjustment part 66 relative to the main body part 60. The inner axle 42 of the shaft member 30 is received through the stepped bore 66d. The axially facing abutment surface 66c axially contacts the expansion part 44 of the shaft member 30. The inner adjustment part 66 is preferably constructed as a one-piece, unitary member of a lightweight rigid material such as a metallic material utilizing conventional manufacturing techniques such as casting and/or machining.

Preferably, the axially facing abutment surface 66c has a maximum diameter the same size or slightly smaller than a maximum diameter of the expansion part 44 and the outer axle 40 (i.e. the same size or slightly smaller maximum diameter than the shaft member 30). Also, the maximum diameter of the axially facing abutment surface 66c is preferably the same size or slightly smaller than the diameter of the hole 14a of the mounting flange 14. Thus, the axially facing abutment surface 66c can move the expansion part 44 to radial expand the shaft member 30 at the second end portion 30b without interference with the outer axle 40 and the hole 14a when the lever member 36 is moved to the fixing position.

Referring to FIGS. 2-11 and 17, the auxiliary body part 62 is slidably supported on the inner adjustment part 66. The auxiliary body part 62 includes a threaded tubular portion 62a, a pair of cam portions 62b and an internal bore 62c extending therethrough. The cam portions 62b have cam surfaces 62d that mate with external cam surfaces of the lever member 34. The internal bore 62c is sized to be slidably supported on an external surface of the attachment portion 66a of the inner adjustment part 66. The internal surface of the cam portions 62b has the same profile as the internal bore 62c as viewed axially such that the inner adjustment part 66 also slidably supports the cam portions 62b. The auxiliary body part 62 is preferably constructed of a lightweight rigid material such as a metallic material utilizing conventional manufacturing techniques such as casting and/or machining.

Referring to FIGS. 2-11 and 18, the outer adjustment part 64 preferably has an annular configuration with a threaded bore 64a and an axially facing abutment surface 64b. The outer adjustment part 64 is threaded onto the threaded tubular portion 62a of the auxiliary body part 62. Thus, the outer adjustment part 64 normally moves axially with the auxiliary body part 62. However, the axial position of the outer adjustment part 64 relative to the auxiliary body part 62 can be adjusted by rotating the outer adjustment part 64 relative to the auxiliary body part 62. The axially facing abutment surface 64b has a minimum diameter larger than the outer diameter of the hole 14a, the expansion part 44 and the outer axle 40. Thus, the axially facing abutment surface 64b exerts an axial force on the mounting flange 14 to provide a clamping action when the lever member 34 is moved to the fixing position. The outer adjustment part 64 is preferably constructed of a lightweight rigid material such as a metallic material utilizing conventional manufacturing techniques such as casting and/or machining.

Figure 9:
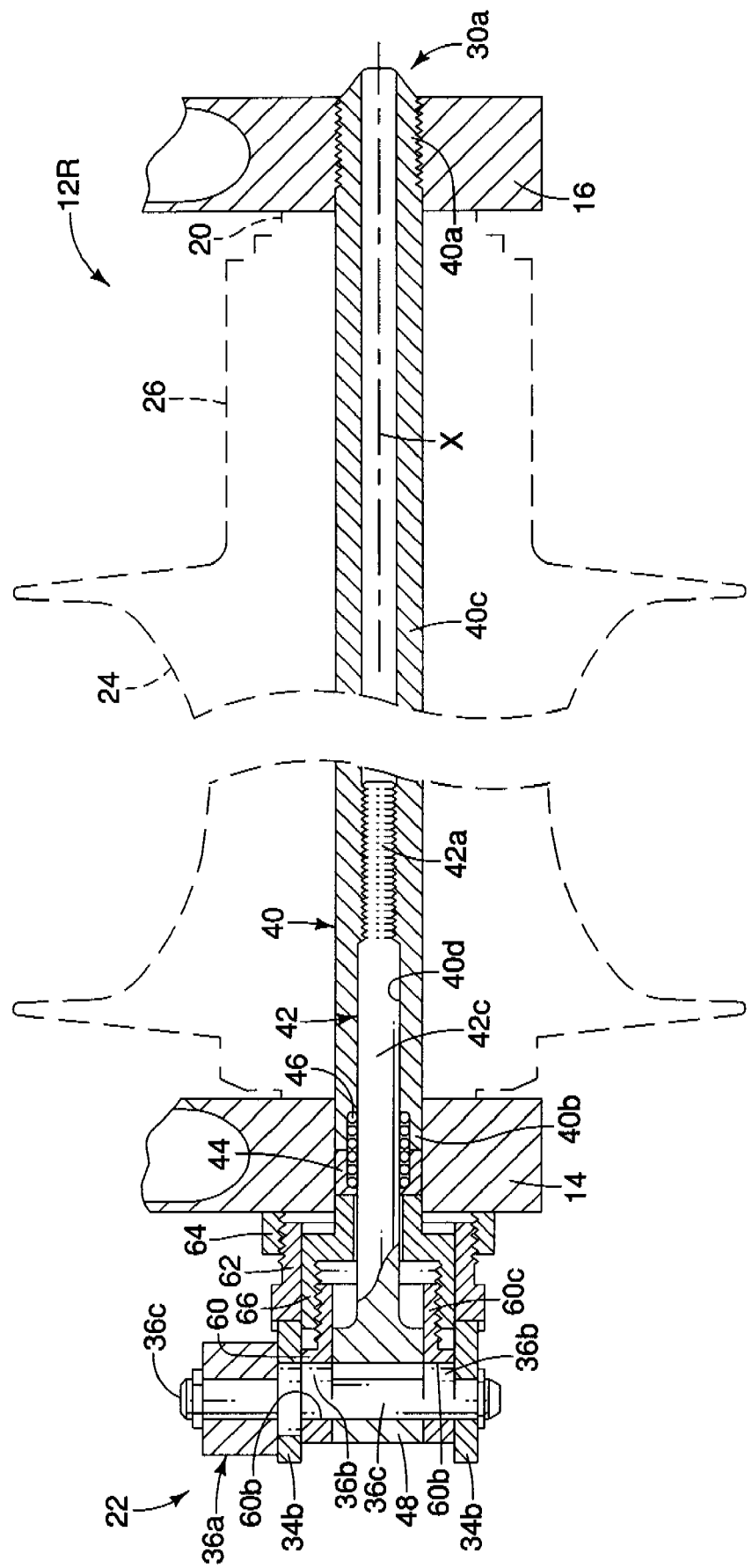
FIG. 9 is a partial cross-sectional view of the portion of the frame and the rear hub illustrated in FIG. 8, but rotated ninety degrees about the center axis for the purpose of illustration.

Referring to FIGS. 7 and 9 the, auxiliary body part 62 and the outer adjustment part 64 constitute a pair of (first) parts of a (first) wheel securing device, which moves relative to the shaft member 30 in response to movement of the (first) lever member 34. Thus, the (first) wheel securing device includes a pair of (first) wheel securing parts (i.e., the auxiliary body part 62 and the outer adjustment part 64) that are axially adjustably (threadedly) coupled together such that relative rotation between the pair of first quick release parts adjusts relative axial positions thereof.

The main body part 60 and the inner adjustment part 66 constitute a pair of (second) parts of a (second) wheel securing device, which moves relative to the shaft member 30 in response to movement of the (second) lever member 36. Thus, the (second) wheel securing device includes a pair of (second) wheel securing parts (i.e., the main body part 60 and the inner adjustment part 66) that are axially adjustably (threadedly) coupled together such that relative rotation between the pair of second wheel securing parts adjusts relative axial positions thereof.

Referring to FIGS. 2-12, the (first) lever member 34 basically includes an operating lever portion 34a, a pair of cam portions 34b and a tab member 34c extending from the operating lever portion 34a. The cam portions 34b are pivotally supported on a part of the lever member 36, as explained below. The cam portions 34b cooperate with the cam portions 62b to move the auxiliary body part 62 axially relative to the shaft member 30 when the lever member 34 is pivoted. Specifically, the auxiliary body part 62 is moved axially relative to the shaft member 30 closer to the first end portion 30a when the (first) lever member 34 is moved from the (first) release position to the (first) fixing position as illustrated in FIGS. 6 and 7. The operating lever portion 34a and the cam portions 34b are preferably integrally formed together as a one-piece, unitary member of a lightweight rigid material such as a metallic material utilizing conventional manufacturing techniques such as casting and/or machining.

Referring still to FIGS. 2-12, the (second) lever member 36 basically includes an operating lever portion 36a, a pair of cam portions 36b and a pivot pin 36c. The cam portions 36b, the operating lever portion 36a and the pivot pin 36c all rotate together. The pivot pin 36c extends through the cam portions 34b of the lever member 34, the main body part 60 and the slot of the bracket 48. The cam portions 34b of the lever member 34 are preferably pivotally supported on the pivot pin 36c such that the lever members 34 and 36 pivot about a common pivot axis. The cam portions 36b are received in the cam openings 60b of the main body part 60. The cam portions 36b cooperate with the cam openings 60b during rotation of the operating lever portion 36a to move the main body part 60 axially closer to the threaded end portion 30a when the operating lever portion 36a is rotated from the release position to the fixing position, as seen in FIGS. 7 and 8, respectively.

Referring now to FIGS. 2-15, assembly and use of the rear hub 12R having the wheel securing axle 22 in accordance with the present invention will now be explained in more detail. Prior to mounting the rear hub 12R having the wheel securing axle 22 to the mounting flanges 14 and 16, the main hub axle 20, the hub assembly 24 and the free wheel 26 are assembled together as a unit in a conventional manner. The wheel securing axle 22 is assembled as a separate unit from the unit including the main hub axle 20, the hub assembly 24 and the free wheel 26 in accordance with the present invention.

In order to assemble the wheel securing axle 22 as a unit, the wheel securing mechanism (i.e., the head member 32, the lever member 34, the lever member 36 and the inner axle 42) is assembled using conventional assembly techniques, as seen in FIGS. 3 and 12. The inner adjustment part 66 is preferably threaded onto the main body part 60 after assembling the wheel securing mechanism (i.e., the head member 32, the lever member 34, the lever member 36 and the inner axle 42), as best understood from FIG. 3. The expansion part 44 and the biasing member 46 are mounted on the inner axle 42 after installing the inner adjustment part 66. The inner axle 42 is inserted into the internal bore 40d and threadedly attached to the outer axle 40 such that axial removal of the inner axle 42 is prevented and such that the expansion part 44 and the biasing member 46 are retained on the inner axle 42, as best understood from FIGS. 3 and 4. Then the set screw 50 is coupled between the outer axle 40 and the inner axle 42 to prevent rotation of the inner axle 42 relative to the outer axle 40, as best understood from FIGS. 3 and 4.

The auxiliary body part 62 and the outer adjustment part 64 can be mounted on the inner adjustment part 66 before or after attaching the inner and outer axles 42 and 40 together. Of course, the outer adjustment part 64 can be threaded onto the auxiliary body part 62 before or after mounting the auxiliary body part 62 on the inner adjustment member 64 adjacent the lever member 36. In any case, once the auxiliary body part 62 and the outer adjustment part 64 are mounted on the above assembly, the wheel securing axle 22 is fully assembled.

The unit including the main hub axle 20, the hub assembly 24 and the free wheel 26 can now be attached to the mounting flanges 14 and 16 using the wheel securing axle 22. In order to mount the rear hub 12R to the frame 11, the unit including the main hub axle 20, the hub assembly 24 and the free wheel 26 is positioned between the mounting flanges 14 and 16. The wheel securing axle 22 is then inserted through the hole 14a of the mounting flange 14, through the main hub axle 20, the hub assembly 24 and the free wheel 26, and threaded into the threaded hole 16a of the mounting flange 16a, as best understood from FIGS. 4-7. Now, the axial positions of the outer adjustment part 64 and/or the inner adjustment part 66 can be adjusted relative to the auxiliary body part 62 and the main body part 60 if needed such that moving the lever members 34 and 36 to their fixing positions results in the desired amount of axial and radial tightening forces, respectively, as best understood from FIGS. 6-11. In this embodiment, it is preferable to make the first wheel securing device for applying an axial force operate prior to making the second wheel securing device for causing radial expansion of the radial expansion structure operate. The tab member 34c works as a "directional or lever moving order" indicator so that a user rotates the (first) lever member 34 prior to the (second) lever member 36.

If the rear wheel needs to be removed, the lever members 34 and 36 are moved to their release positions, and then the entire wheel securing axle 22 is rotated to detach the shaft 30 from the mounting flange 16. Moving the lever member 34 alone to its release position will also move the lever member 36 to its release position due to the configuration of the tab 34c. In any case, once the lever members 34 and 36 are in their release positions, the entire wheel securing axle 22 can be unthreaded from the mounting flange 16 and axially removed. Then, the remainder of the rear wheel can be removed from the rear triangle 13 of the bicycle frame 11. The installation procedure above can be repeated to reattach the rear hub 12R to the bicycle frame 11. With the arrangement illustrated herein, the shaft member 30 can be located in the same position relative to the mounting flange 16 (i.e. if fully tightened) every time it is installed. Thus, the arrangement illustrated herein, it is possible to leave the adjustment parts 64 and 66 in the same positions when removing and reinstalling the rear hub 12R. However, as mentioned above, it will be apparent to those skilled in the art from this disclosure that various modifications can be made to the threaded bore 16a and the first threaded end portion 30a as needed and/or desired, without departing from the scope of the present invention.

The threaded connection (the connection between the first threaded end 42a and the threaded section 40f) disposed between the outer axle 40 and the inner axle 42 form part of a fixing structure of the shaft member 30 (disposed between the outer axle 40 and the inner axle 42), which releasably prevents axial removal of the inner axle 42 from the internal bore 40d when the inner axle 42 is in the installed position. The set screw 50 mounted in the transverse threaded hole 40e of the outer axle 40 and the external surface of the inner axle 42 also form part of the fixing structure of the shaft member 30 (disposed between the outer axle 40 and the inner axle 42), which releasably prevents relative rotation of the inner axle 42 within the internal bore 40*d* when the inner axle 42 is in the installed position.

Figure 19:
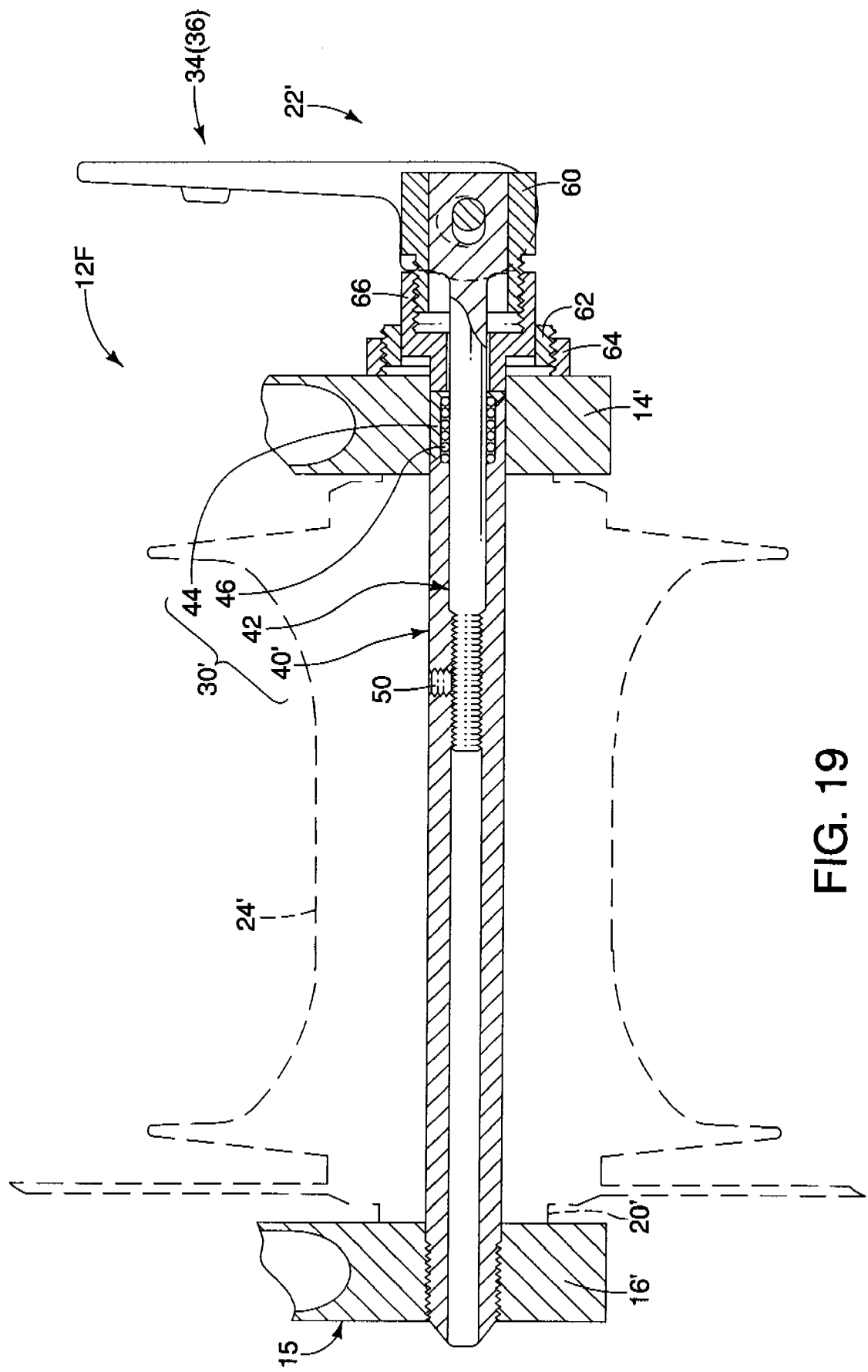
FIG. 19 is an enlarged, partial cross-sectional view of a portion of the frame and the front hub illustrated in FIG. 1, with the wheel securing axle in a fully installed position after clamping the frame using the wheel securing lever.
Figure 20:
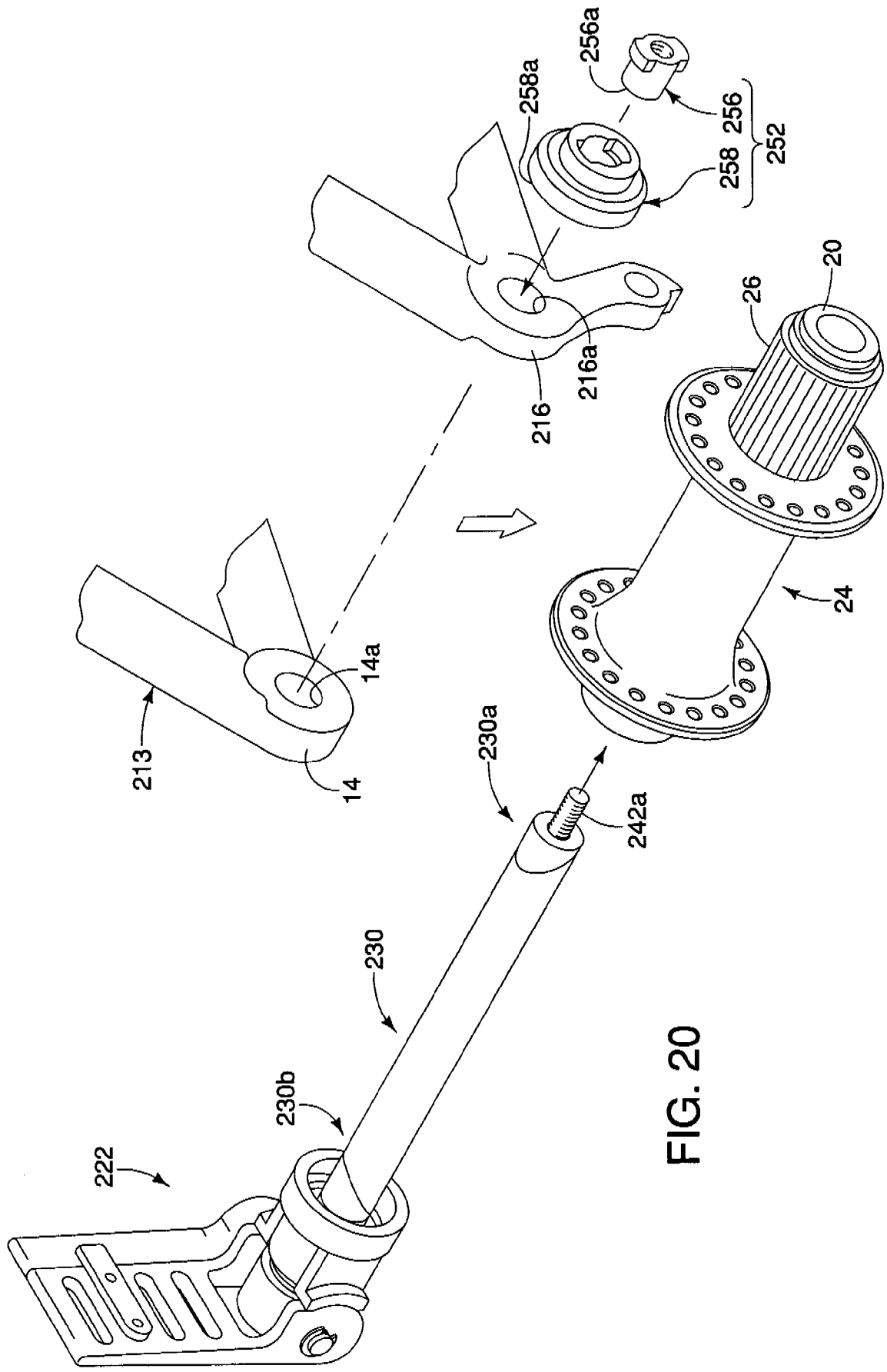
FIG. 20 is an enlarged, exploded perspective view of a portion of a frame and a rear hub in accordance with a second embodiment of the present invention.
Figure 21:
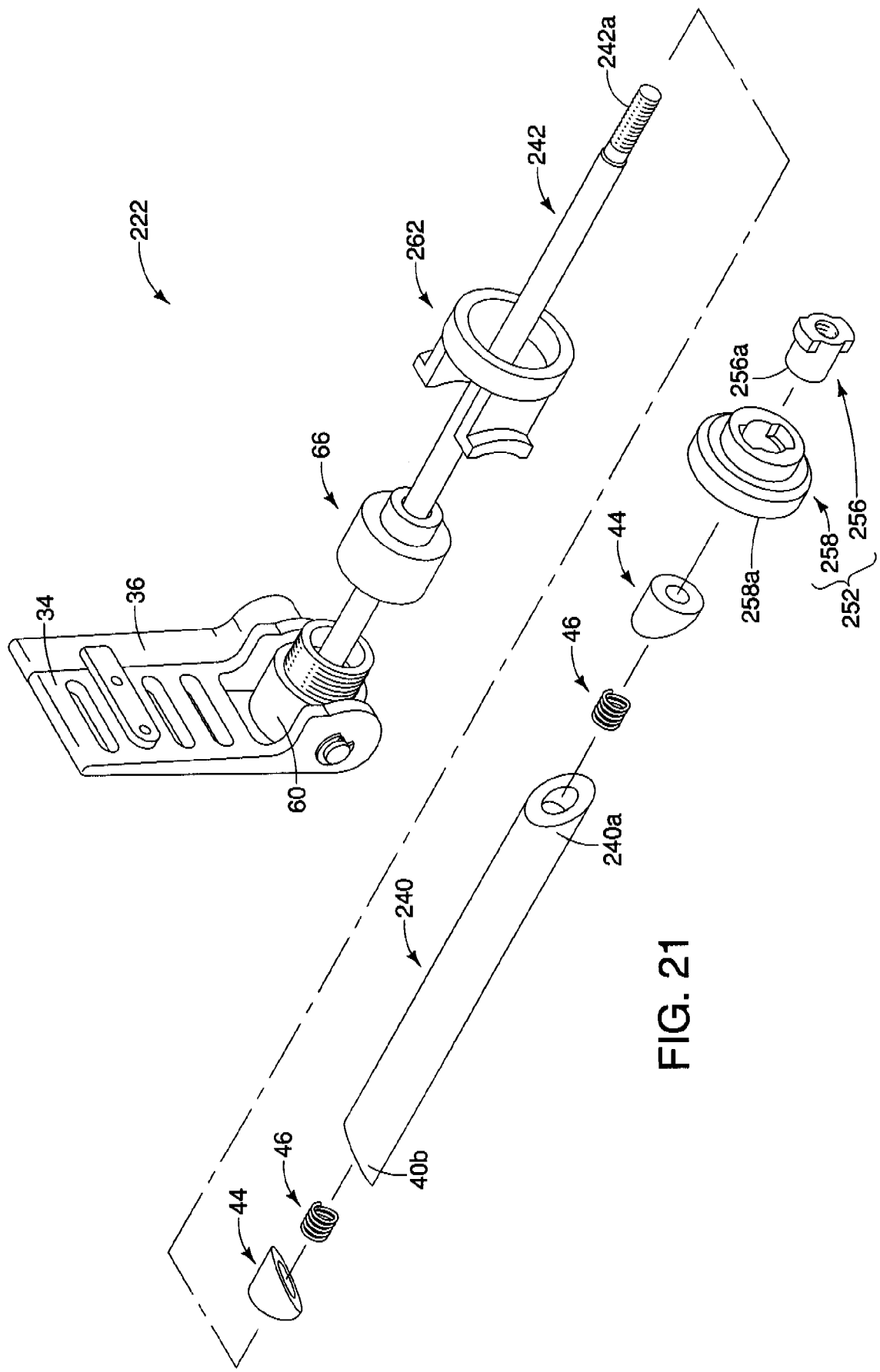
FIG. 21 is an exploded, perspective view of the wheel securing axle of the rear hub illustrated in FIG. 20.
Figure 22:
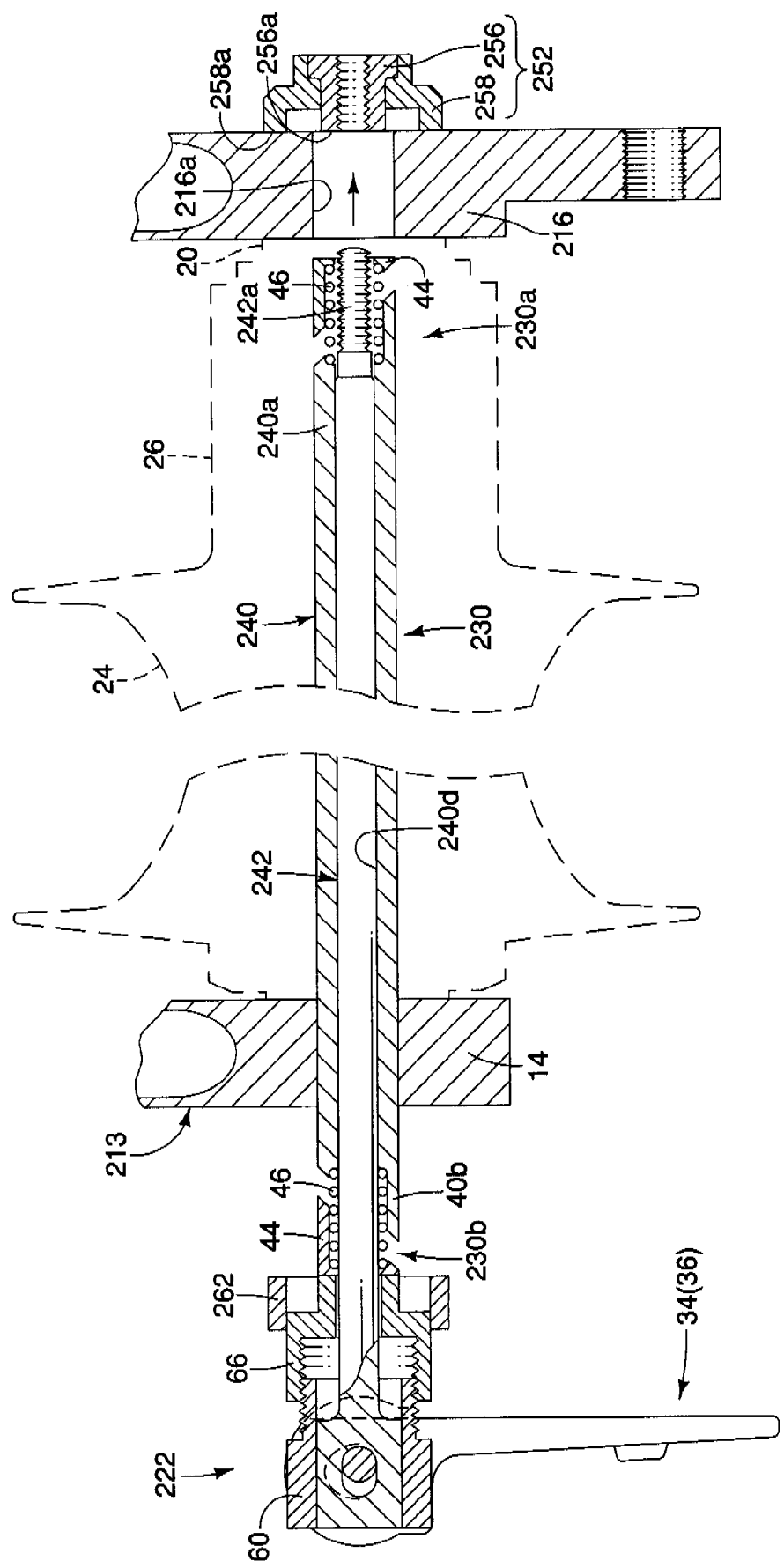
FIG. 22 is an enlarged, partial cross-sectional view of the portion of the frame and the rear hub illustrated in FIGS. 20-21, with the wheel securing axle in a first, partially installed position.
Figure 23:
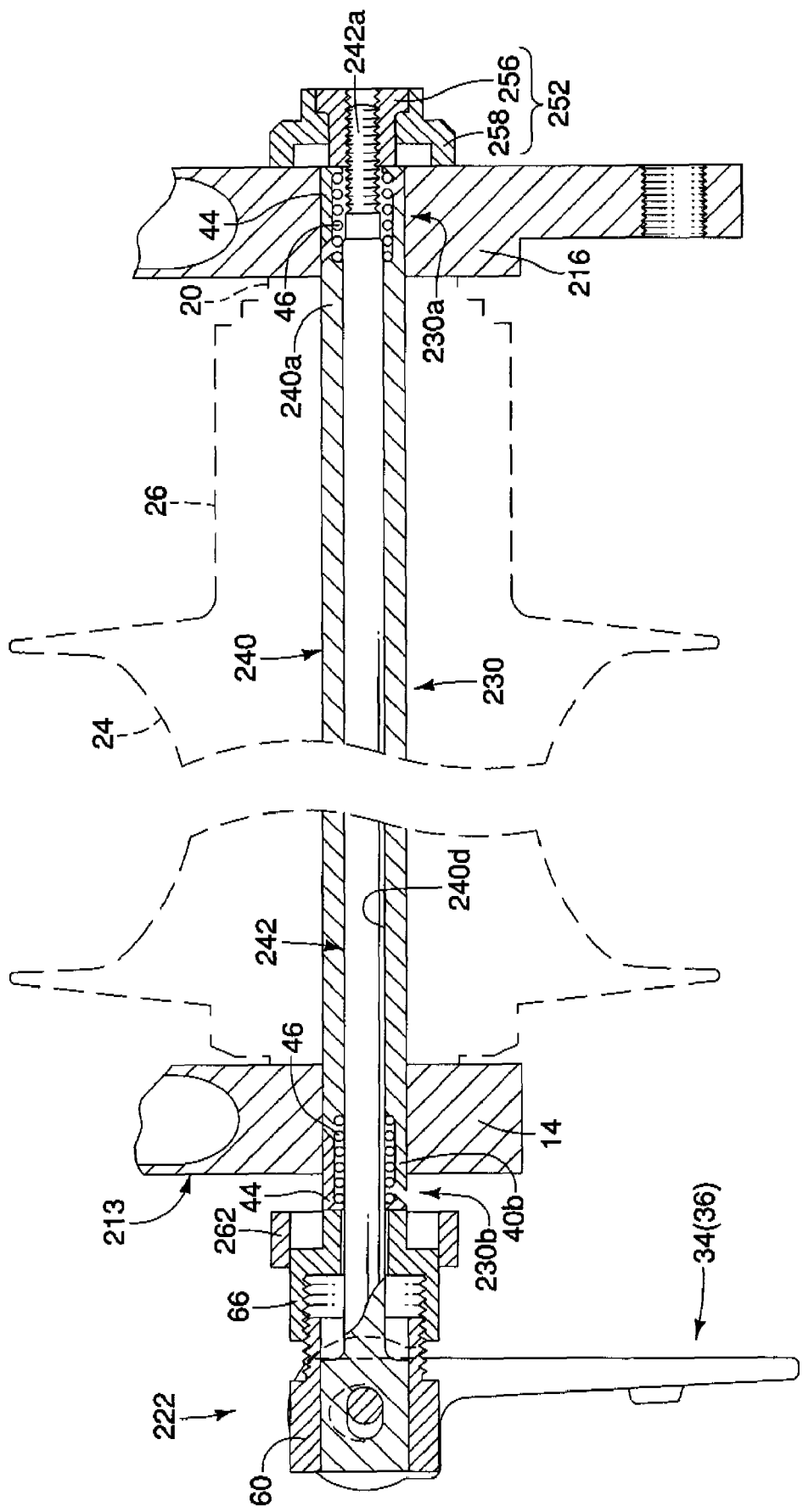
FIG. 23 is an enlarged, partial cross-sectional view of the portion of the frame and the rear hub illustrated in FIGS. 20-21, with the wheel securing axle in a second, partially installed position.
Figure 24:
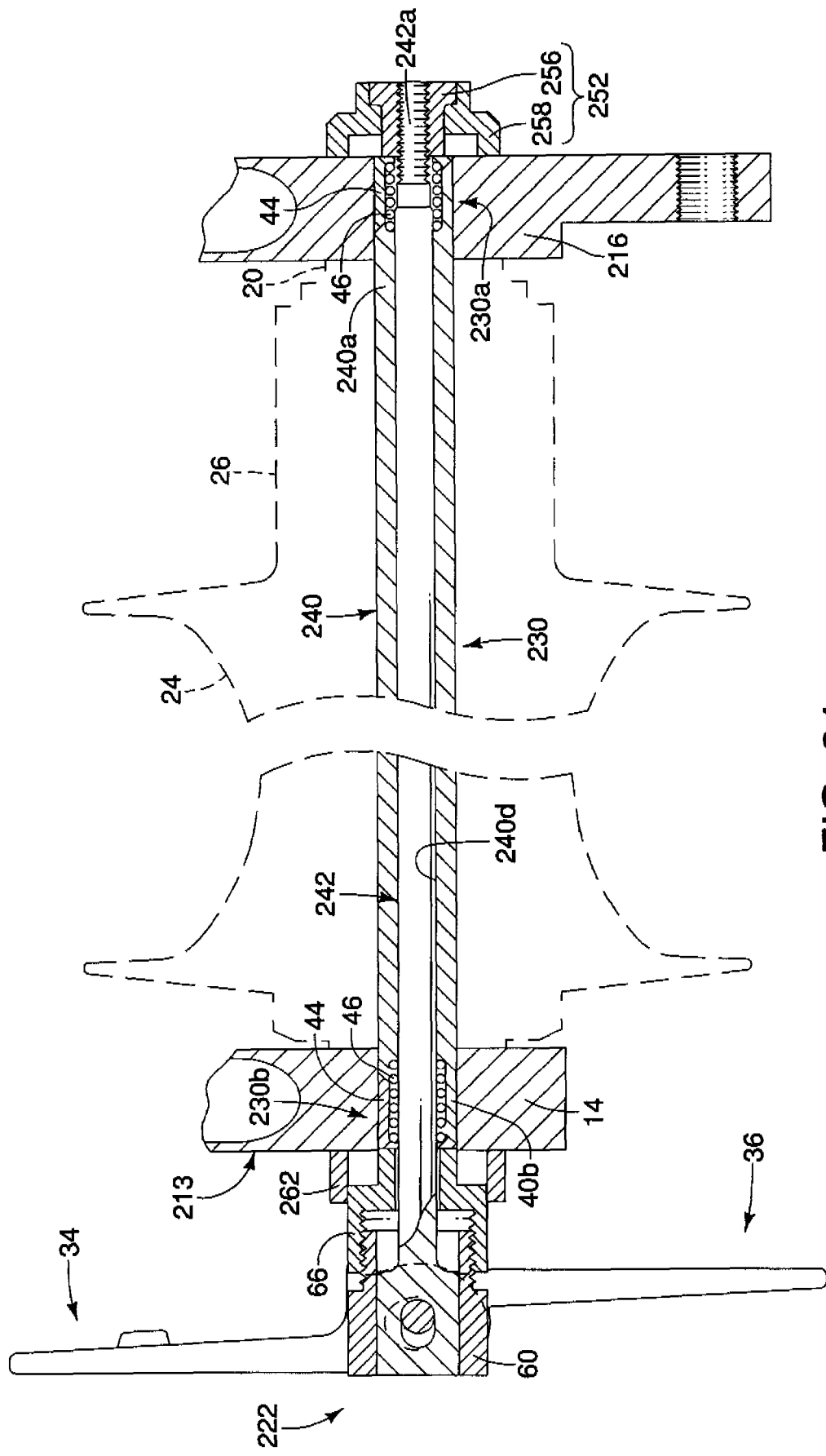
FIG. 24 is an enlarged, partial cross-sectional view of the portion of the frame and the rear hub illustrated in FIGS. 20-21, with the wheel securing axle in a third, partially installed position and after moving the first wheel securing lever to the first fixing position but prior to moving the second wheel securing lever to the second fixing position.
Figure 25:
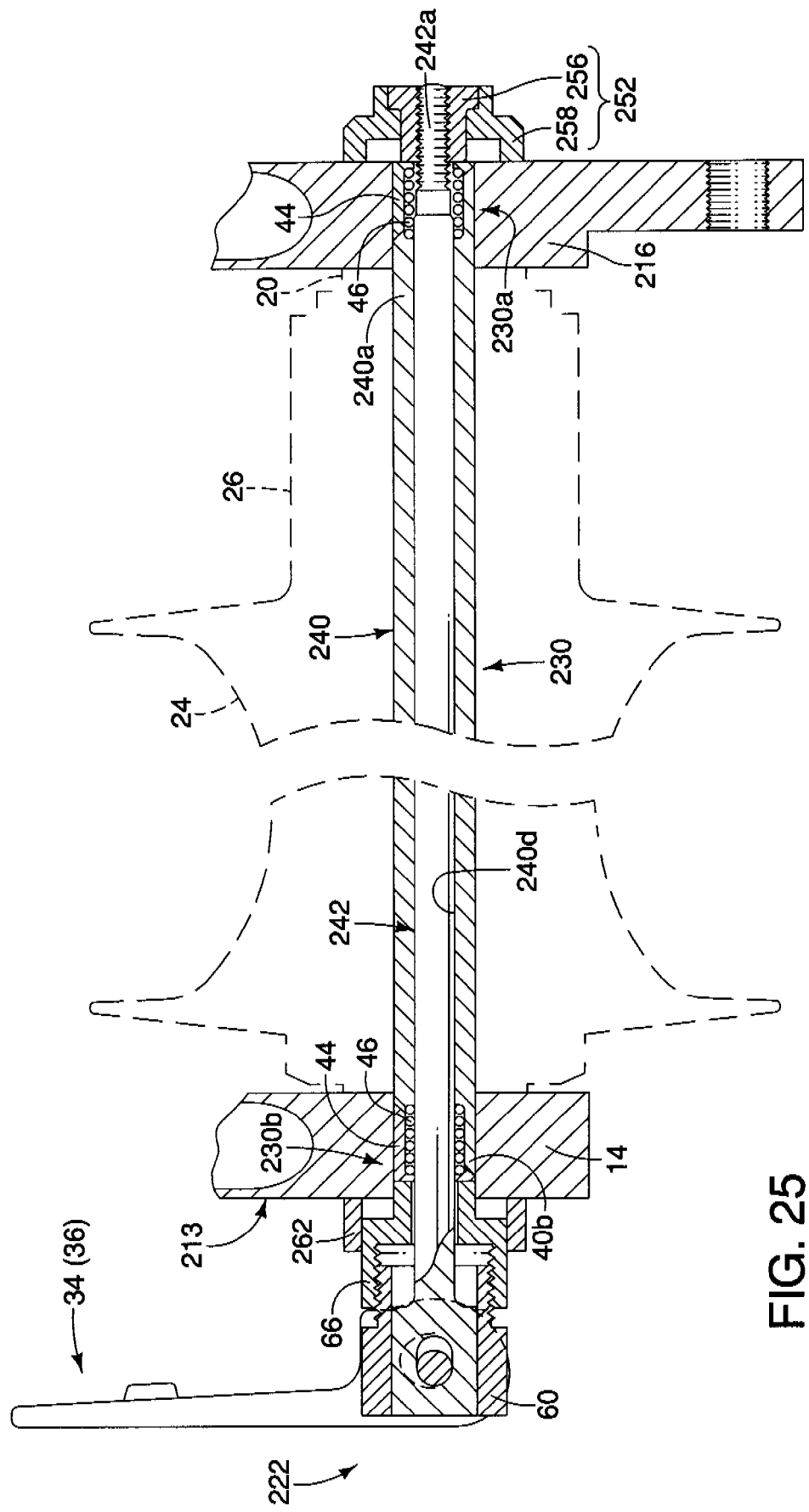
FIG. 25 is an enlarged, partial cross-sectional view of the portion of the frame and the rear hub illustrated in FIGS. 20-21, with the wheel securing axle fully installed (i.e. with both the first and second wheel securing levers in the first and second fixing positions, respectively)
Figure 26:
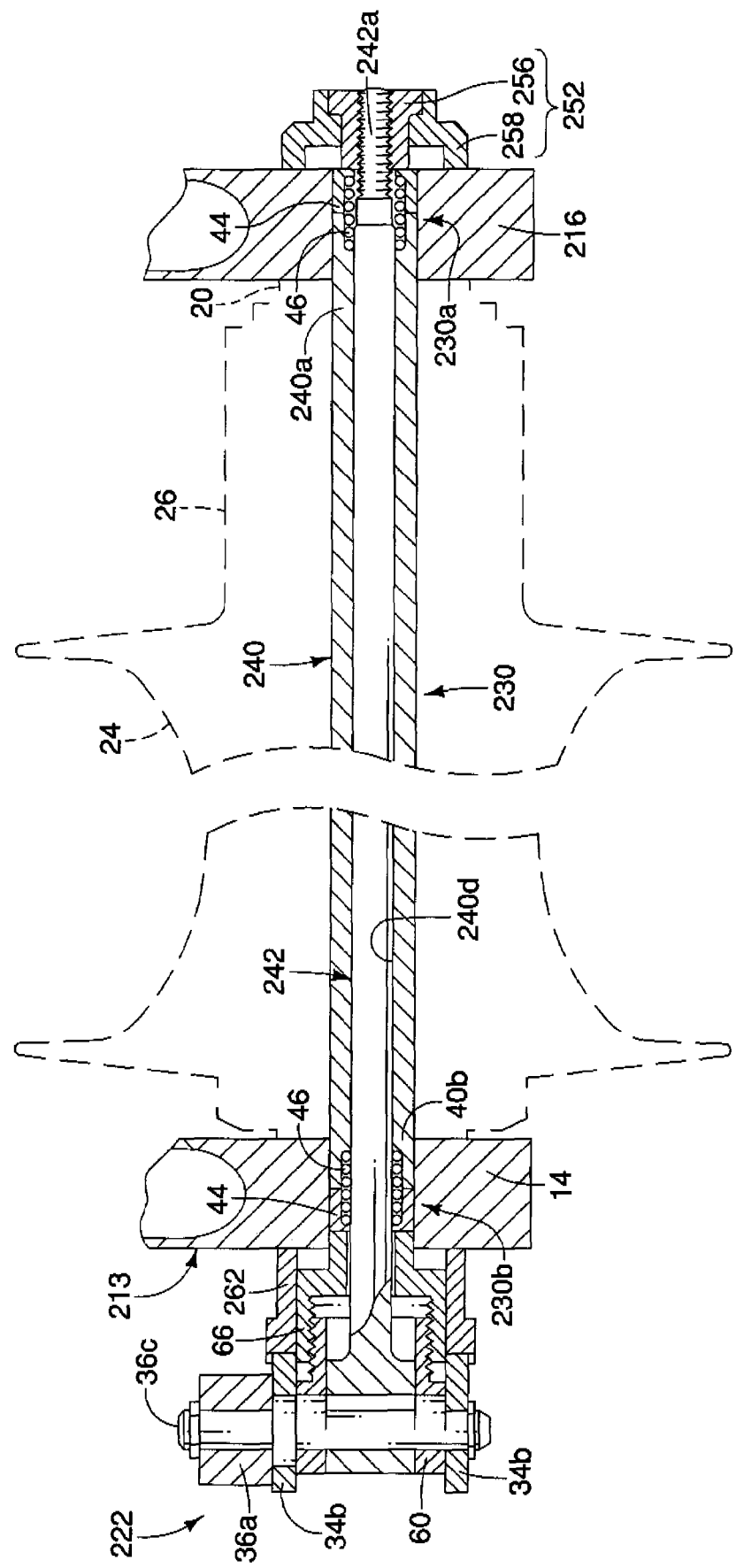
FIG. 26 is a partial cross-sectional view of the portion of the frame and the rear hub illustrated in FIG. 25, but rotated ninety degrees about the center axis for the purpose of illustration.
Figure 33:
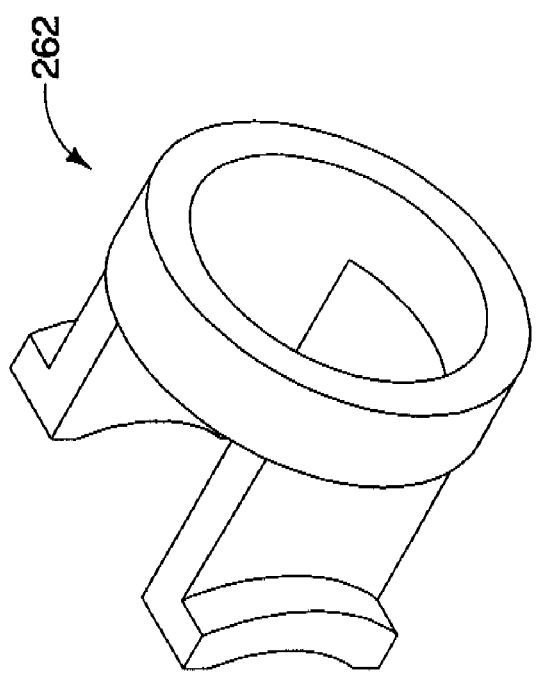
FIG. 33 is an enlarged perspective view of an outer abutment part of the wheel securing axle illustrated in FIGS. 20-26.
Figure 35:
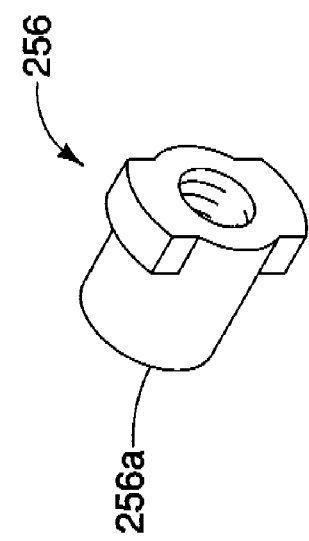
FIG. 35 is an enlarged perspective view of a nut of the wheel securing axle illustrated in FIGS. 20-26.
Figure 34:
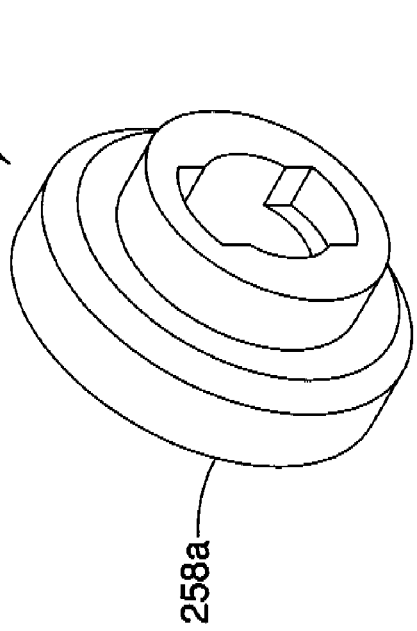
FIG. 34 is an enlarged perspective view of a nut holder of the wheel securing axle illustrated in FIGS. 20-26.
Figure 32:
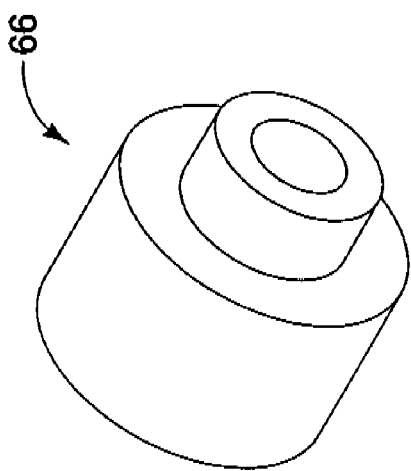
FIG. 32 is an enlarged perspective view of an inner adjustment part of the wheel securing axle illustrated in FIGS. 20-26.

Referring now to FIGS. 1 and 19, the front hub 12F will now be explained in more detail. The front hub 12F is identical to the rear hub 12R, except the free wheel 26 of the rear hub 12R has been eliminated. Due to the elimination of the free wheel 26, the front hub 12F and some of its parts are narrower than equivalent parts of the rear hub 12R.

The front hub 12F is secured to the frame 11 using a wheel securing axle 22' in a manner identical to the rear hub 12R, as mentioned above. Specifically, the frame 11 includes a front fork 15 with a pair of hub mounting flanges 14' and 16' formed at the free ends thereof. Preferably, one end of the wheel securing axle 22' is directly threadedly attached to the mounting flange 16', while the other end has a wheel securing mechanism that is used to securely attach the wheel securing axle 22' to the other mounting flange 14'. The mounting flanges 14' and 16' are identical to the mounting flanges 14 and 16, respectively, except that the mounting flanges 14' and 16' are closer together due to the narrower configuration of the front hub 12F.

In view of the similarity between the front and rear hubs 12F and 12R and the front and rear mounting flanges 14, 14', 16 and 16', the front hub 12F and the mounting flanges 14' and 16' will not be discussed and/or illustrated in detail herein. However, it will be apparent to those skilled in the bicycle art from this disclosure that the descriptions and illustrations of the rear hub 12R and the rear mounting flanges 14 and 16 also apply to this front hub 12F and the front mounting flanges 14' and 16', respectively, except as explained and/or illustrated herein.

Parts of the front hub 12F that are identical to parts of the rear hub 12R will be identified with same reference characters as the rear hub 12R for the sake of convenience. Parts of the front hub 12F that are functionally identical (but not exactly identical) to parts of the rear hub 12R will be identified with the same reference characters but with a prime (') added thereto for the sake of convenience. Parts of the front hub 12F that are functionally identical to parts of the rear hub 12R are identical to parts of the rear hub 12R, except the parts of the front hub 12F that are functionally identical to parts of the rear hub 12R are longitudinally shorter than the corresponding parts of the rear hub 12R. In other words, the wheel securing axle 22' is identical to the wheel securing axle 22, except that some of the parts of the wheel securing axle 22' are longitudinally shorter (narrower) than corresponding parts of the wheel securing axle 22. Thus, the wheel securing axle 22' of the front hub 12F will not be discussed and/or illustrated in further detail herein.

Second Embodiment

Referring now to FIGS. 20-35, a modified wheel securing axle 222 having a modified shaft member 230 with a modified first end portion 230*a* designed to be mounted to a modified rear triangle 213 in accordance with a second embodiment of the present invention will now be explained. The wheel securing axle 222 of this second embodiment is identical to the wheel securing axle 22 of the first embodiment, except for the first end portion 230*a* of the shaft member 230. Accordingly, this second embodiment will not be discussed and/or illustrated in detail herein, except as related to the first end portion 230*a* and the modified rear triangle 213. However, it will be apparent to those skilled in the bicycle art from this disclosure that the descriptions and illustrations of the first embodiment also apply to this second embodiment, except as explained and/or illustrated herein. Moreover, it will be apparent to those skilled in the bicycle art from this disclosure that the wheel securing axle 222 is designed to replace the wheel securing axle 22 of the first embodiment to mount the unit including the main hub axle 20, the hub assembly 24 and the free wheel 26 to the rear triangle 213 in the manner described above with respect to the first embodiment, except as explained and illustrated herein.

Parts of this second embodiment that are identical to parts of the first embodiment will be identified with same reference characters as the first embodiment for the sake of convenience. Parts of this second embodiment that are functionally identical (but not exactly identical) to parts of the first embodiment will be identified with the same reference characters but with "200" added thereto for the sake of convenience.

The shaft member 230 includes a modified outer axle 240, a modified inner axle 242, an additional radial expansion part 44, an additional biasing member 46 and a retaining member 252. The modified rear triangle is identical to the rear triangle 13, except it includes a modified mounting flange 216 with an unthreaded through bore 216*a*. The outer axle 240 has a modified first axial end 240*a* that is identical to its second axial end 40*b* and a modified through bore 240*d* that is unthreaded. The inner axle 242 is longer than the inner axle 42 such that a modified threaded end 242*a* extends out of the internal bore 240*d*. The additional expansion part 44 and biasing member 46 are disposed on the inner axle 242 adjacent the first axial end 240*a* of the outer axle 240 to radially expand the shaft member 230 at the first end portion 230*a* in addition to the opposite end. The retaining member 252 is attached to the threaded end 242*a*.

The retaining member 252 includes a nut 256 that is non-rotatably received in an opening of a holding part 258. The first end 242*a* is threadedly attached to the nut 256 of the assembled holding part 258. The holding part 258 includes an axially facing (first) abutment surface 258*a* that contact the mounting flange 216. The axially facing abutment surface 258*a* has a minimum diameter larger than a maximum outer diameter of the hole 216*a*, the expansion part 44 and the outer axle 240 such that the holding part 258 applies an axial force on the mounting flange 216. The nut 256 has an axially facing (second) abutment surface 256*a* that contacts the expansion part 44 of the second end portion 230*a* when the lever member 36 is moved to its fixing position. The axially facing abutment surface 256*a* has a maximum diameter the same size or slightly smaller than the maximum outer diameter of the hole 216*a*, the expansion part 44 and the outer axle 240. Due to the arrangements of the expansion parts 44 at both the first and second end portions 230*a* and 230*b* in this embodiment, radial expansion of the shaft member 230 occurs in both mounting flanges 14 and 216 in this embodiment. Mounting and assembly of this embodiment are basically the same as the first embodiment, except that the inner axle 242 and outer axle 240 do not need to be rotated during attachment/detachment to the mounting flanges 14 and 216. Specifically, the retainer member 252 can be threaded onto the inner axle 242 after inserting the assembled shaft 230 through the mounting hole 216*a*. Also, in this embodiment, due to the threaded (adjustable) arrangement at the retainer member 252, the outer adjustment part 64 can be eliminated and a modified auxiliary body part 262 can be provided, which dos not have threads. However, due to this arrangement, the retainer member 252 may need to be rotated to adjust the clamping force provided by the auxiliary body part 262. While radial expansion structures are provided at both of the first and second end portions 230*a* and 230*b* in this embodiment, it will be apparent to those skilled in the art from this disclosure that only one radial expansion structure may be provided. For example, the radial expansion structure disposed at the second end portion 230*b* may be omitted such that a radial expansion structure is only provided at the first end portion 230*a*.

Third Embodiment

Figure 36:
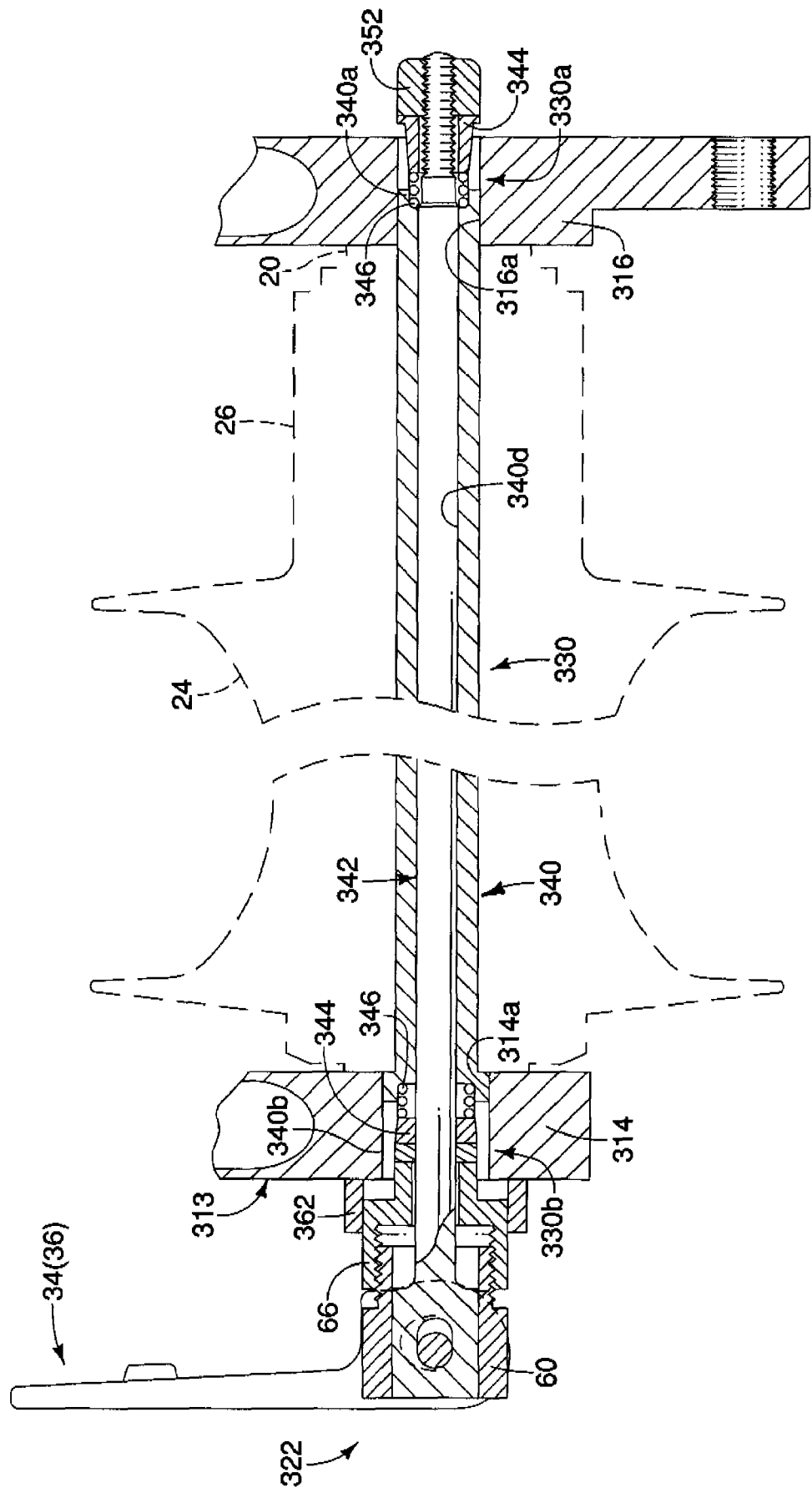
FIG. 36 an enlarged, partial cross-sectional view of a portion of a frame and a rear hub in accordance with a third embodiment of the present invention, with the wheel securing axle fully installed (i.e. with both the first and second wheel securing levers in the first and second fixing positions, respectively).

Referring now to FIG. 36, a modified wheel securing axle 322 having a modified shaft member 330 with modified first and second end portions 330*a* and 330*b* designed to be mounted to a modified rear triangle 313 in accordance with a third embodiment of the present invention will now be explained. The wheel securing axle 322 of this third embodiment is identical to the wheel securing axle 22 of the first embodiment, except the modified shaft member 330. Accordingly, this third embodiment will not be discussed and/or illustrated in detail herein, except as related to the modified shaft member 330 and the modified rear triangle 313. However, it will be apparent to those skilled in the bicycle art from this disclosure that the descriptions and illustrations of the first embodiment also apply to this third embodiment, except as explained and/or illustrated herein. Moreover, it will be apparent to those skilled in the bicycle art from this disclosure that the wheel securing axle 322 is designed to replace the wheel securing axle 22 of the first embodiment to mount the unit including the main hub axle 20, the hub assembly 24 and the free wheel 26 to the rear triangle 313 in the manner described above with respect to the first embodiment, except as explained and illustrated herein.

Parts of this third embodiment that are identical to parts of the first embodiment will be identified with same reference characters as the first embodiment for the sake of convenience. Finally, parts of this third embodiment that are functionally identical (but not exactly identical) to parts of the first embodiment will be identified with the same reference characters but with "300" added thereto for the sake of convenience.

The shaft member 330 includes a modified outer axle 340, a modified inner axle 342, a pair of modified radial expansion parts 344, a pair of modified biasing members 346 and a retaining member 352. The modified rear triangle is identical to the rear triangle 13, except it includes a modified mounting flange 314 with a through opening 314*a* slightly larger than the opening 14*a* and a modified mounting flange 316 with an unthreaded through bore 316*a*. The outer axle 240 has a modified first axial end 340*a* and a modified second axial end 340*b*, which are tubular shaped and having a plurality of circumferentially equally spaced axially extending slits (e.g. four) extending from the free ends thereof. The outer axle 340 further includes a modified through bore 340*d* that is unthreaded and a stepped external surface at the second axial end 340*b*, which contacts the main axle 20 to properly axially locate the outer axle 340 in the holes 314*a* and 316*a*.

The first and second axial ends 340*a* and 340*b* have internal tubular tapered (conical) surfaces that cooperate with similarly shaped external tubular tapered (conical) surfaces of the expansion parts 344 to expand the outer diameter of the outer axle 340 at the first and second end portions 330*a* and 330*b* within the holes 314*a* and 316*a* in response to axial movement of the expansion parts 344. The inner axle 342 is longer than the inner axle 42 such that a modified threaded end 342*a* extends out of the internal bore 340*d*. The expansion parts 344 and the biasing members 346 are disposed on the inner axle 242 partially within the first axial end 340*a* and the second axial end 340*b*. The biasing members 346 are axially shorter than the biasing members 46 of the first embodiment, and are disposed within the first and second axial ends 340*a* and 340*b* to bias the expansion parts 344 out of engagement with the first and second axial ends 340*a* and 340*b* of the outer axle 340. The retaining member 352 is a nut that is threadedly attached to the threaded end 342*a*.

Due to the arrangement of the shaft member 330, radial expansion of the shaft member 330 occurs at both mounting flanges 314 and 316 in this embodiment. Mounting and assembly of this embodiment are basically the same as the first embodiment, except that the inner axle 342 and outer axle 340 do not need to be rotated during attachment/detachment to the mounting flanges 314 and 316. Specifically, the retainer member 352 can be threaded onto the inner axle 342 after inserting the assembled shaft 330 through the mounting hole 316*a*. Also, in this embodiment, due to the threaded (adjustable) arrangement at the retainer member 352, the outer adjustment part 64 can be eliminated and a modified auxiliary body part 362 can be provided, which dos not have threads. However, due to this arrangement, the retainer member 352 may need to be rotated to adjust the clamping force provided by the auxiliary body part 362. Depending on the desired clamping force, some radial expansion may occur at the first end portion 330*a* when the lever member 34 is moved to its fixing position. However, the inner adjustment part 66 is adjusted to provide the desired radial expansion at the first and second end portions 330*a* and 330*b* when the lever member 36 is moved to its fixing position. While radial expansion structures are provided at both of the first and second end portions 330*a* and 330*b* in this embodiment, it will be apparent to those skilled in the art from this disclosure that one of the radial expansion structures may be omitted.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle wheel securing structure comprising:
a shaft member having a first end portion and a second end portion with a longitudinal center axis extending therebetween;
a head member coupled to the shaft member at the second end portion of the shaft member;
a first wheel securing device positioned at the second end portion of the shaft member;
a second wheel securing device positioned at at least one of the first and second end portions of the shaft member, the second wheel securing device moving relative to the shaft member in response to movement of the second lever member to cause radial expansion of the shaft member;
a first lever member operatively connected to the first wheel securing device to move the first wheel securing device in response to movement of the first lever member; and
a second lever member operatively connected to the second wheel securing device to move the second wheel securing device in response to movement of the second lever member.

2. A bicycle wheel securing structure comprising:
a shaft member having a first end portion and a second end portion with a longitudinal center axis extending therebetween;
a head member coupled to the shaft member at the second end portion of the shaft member;
a first wheel securing device positioned at the second end portion of the shaft member, the first wheel securing device moves relative to the shaft member in response to movement of the first lever member to apply an axial force;
a second wheel securing device positioned at least one of the first and second end portions of the shaft member, the second wheel securing device moving relative to the shaft member in response to movement of the second lever member to cause radial expansion of the shaft member;
a first lever member operatively connected to the first wheel securing device to move the first wheel securing device in response to movement of the first lever member; and
a second lever member operatively connected to the second wheel securing device to move the second wheel securing device in response to movement of the second lever member.

3. The bicycle wheel securing structure according to claim 2, wherein
the first and second lever members move at least partially independently of each other to move the first and second wheel securing devices at least partially independently of each other.

4. The bicycle wheel securing structure according to claim 2, wherein
the first and second lever members are pivotal about a common pivot axis.

5. The bicycle wheel securing structure according to claim 2, wherein
the first wheel securing device includes a pair of first wheel securing parts that are axially adjustably coupled together.

6. The bicycle wheel securing structure according to claim 5, wherein
the pair of first wheel securing parts are threadedly coupled together such that relative rotation between the pair of first wheel securing parts adjusts relative axial positions thereof.

7. The bicycle wheel securing structure according to claim 5, wherein
the second wheel securing device includes a pair of second wheel securing parts that are axially adjustably coupled together.

8. The bicycle wheel securing structure according to claim 7, wherein
the pair of second wheel securing parts are threadedly coupled together such that relative rotation between the pair of second wheel securing parts adjusts relative axial positions thereof.

9. The bicycle wheel securing structure according to claim 2, wherein
the first wheel securing device includes a first axially facing abutment surface disposed radially outwardly of an outer most diameter of the shaft member, and the second wheel securing device includes a second axially facing abutment surface disposed radially inwardly of the outer most diameter of the shaft member.

10. The bicycle wheel securing structure according to claim 2, wherein
the second wheel securing device includes a pair of second wheel securing parts that are axially adjustably coupled together.

11. The bicycle wheel securing structure according to claim 10, wherein
the pair of second wheel securing parts are threadedly coupled together such that relative rotation between the pair of second wheel securing parts adjusts relative axial positions thereof.

12. The bicycle wheel securing structure according to claim 2, wherein
the shaft member includes a radial expansion part at the second end portion that is moved axially by the second wheel securing device when the second wheel securing lever is moved from a second release position to a second fixing position to cause radial expansion of the shaft member at the second end portion.

13. The bicycle wheel securing structure according to claim 12, wherein
the radial expansion part has a first inclined surface and the second end portion of the shaft member has a second inclined surface that cooperates with the first inclined surface of the expansion member to cause the radial expansion of the shaft member.

14. The bicycle wheel securing structure according to claim 12, wherein
the shaft member includes an additional radial expansion part at the first end portion of the shaft member to cause radial expansion of the shaft member at the first end portion when the second wheel securing lever is moved from the second release position to the second fixing position.

15. The bicycle wheel securing structure according to claim 14, wherein
the shaft member has a retaining member adjustably coupled at the first end portion.

16. The bicycle wheel securing structure according to claim 15, wherein
the shaft member includes an outer axle and an inner axle at least partially disposed within the outer axle, the outer axle having a first outer axial end with a first inner axial end of the inner axle extending therefrom and a second outer axial end with a second inner axial end extending therefrom, and the head member is coupled to the second inner axial end of the inner axle and the retaining member is coupled to the first inner axial end of the inner axle.

17. The bicycle wheel securing structure according to claim 16, wherein the retaining member includes a nut that is threadedly attached to the first inner axial end of the inner axle and a holding part non-rotatably engaged with the nut.

18. The bicycle wheel securing structure according to claim 17, wherein the holding part includes a first axially facing abutment surface disposed radially outwardly of an outer most diameter of the shaft member, and the nut includes a second axially facing abutment surface disposed radially inwardly of the outer most diameter of the shaft member.

19. The bicycle wheel securing structure according to claim 12, wherein the first end portion of the shaft member is externally threaded.

20. The bicycle wheel securing structure according to claim 2, wherein the first and second lever members are both located closer to the second end portion of the shaft member than the first end portion of the shaft member.

21. The bicycle wheel securing structure according to claim 2, wherein the shaft member includes an outer axle having a first axial end and a second axial end and an inner axle extending from the second axial end of the outer axle with the head member coupled thereto.

22. The bicycle wheel securing structure according to claim 21, wherein the inner axle is a separate member from the outer axle that is releasably disposed within an internal bore of the outer axle in an installed position.

23. The bicycle wheel securing structure according to claim 22, wherein the shaft member includes a fixing structure disposed between the inner axle and the outer axle to releasably prevent axial removal of the inner axle from the internal bore when the inner axle is in the installed position.

24. The bicycle wheel securing structure according to claim 23, wherein the fixing structure includes a threaded connection between the outer axle and the inner axle.

25. The bicycle wheel securing structure according to claim 23, wherein the shaft member includes a fixing structure disposed between the outer axle and the inner axle to releasably prevent relative rotation of the inner axle within the internal bore when the inner axle is in the installed position.

26. The bicycle wheel securing structure according to claim 25, wherein the fixing structure includes a set screw arranged in a transverse threaded bore of the outer axle, the transverse threaded bore extending between an external surface of the outer axle and the internal bore such that the set screw is releaseably engageable with the inner axle.

27. The bicycle wheel securing structure according to claim 26, wherein the fixing structure includes a threaded connection between the outer axle and the inner axle.

28. The bicycle wheel securing structure according to claim 25, wherein the fixing structure includes a threaded connection between the outer axle and the inner axle.

* * * * *